(12) United States Patent
Hench et al.

(10) Patent No.: US 6,970,560 B1
(45) Date of Patent: Nov. 29, 2005

(54) METHOD AND APPARATUS FOR IMPAIRMENT DIAGNOSIS IN COMMUNICATION SYSTEMS

(75) Inventors: John Josef Hench, San Jose, CA (US); Thorkell Gudmundsson, San Jose, CA (US); Amir Gholamhossein Zadeh Aghdam, Santa Clara, CA (US); Ioannis Kanellakopoulos, Cupertino, CA (US); Gurcan Aral, Cupertino, CA (US); Yaolong Tan, Fremont, CA (US); Harbinder Singh, San Jose, CA (US); Sunil C. Shah, Los Altos, CA (US)

(73) Assignee: Tokyo Electron Limited, Tokyo (JP)

( * ) Notice: Subject to any disclaimer, the term of this patent is extended or adjusted under 35 U.S.C. 154(b) by 914 days.

(21) Appl. No.: 09/710,703

(22) Filed: Nov. 10, 2000

Related U.S. Application Data

(60) Provisional application No. 60/220,078, filed on Jul. 21, 2000, provisional application No. 60/220,071, filed on Jul. 21, 2000, provisional application No. 60/220,075, filed on Jul. 21, 2000, provisional application No. 60/220,074, filed on Jul. 21, 2000, provisional application No. 60/183,675, filed on Feb. 18, 2000, provisional application No. 60/181,125, filed on Feb. 8, 2000, provisional application No. 60/165,399, filed on Nov. 11, 1999, provisional application No. 60/164,986, filed on Nov. 11, 1999.

(51) Int. Cl.$^7$ .............................................. H04M 1/76
(52) U.S. Cl. ................. 379/417; 379/399.01; 379/414; 375/254; 375/346
(58) Field of Search .......................... 379/93.01, 93.05, 379/399.01, 414, 417; 375/254, 346

(56) References Cited

U.S. PATENT DOCUMENTS

| | | |
|---|---|---|
| 3,814,868 A | 6/1974 | Bradley |
| 4,649,505 A | 3/1987 | Zinser, Jr. et al. |
| 4,669,113 A | 5/1987 | Ash et al. |
| 4,669,505 A | 6/1987 | Nelson et al. |
| 4,715,064 A | 12/1987 | Claessen |
| 4,760,596 A | 7/1988 | Agrawal et al. |
| 4,987,569 A | 1/1991 | Ling et al. |
| 5,063,351 A | 11/1991 | Goldthorp et al. |
| 5,157,690 A | 10/1992 | Buttle |
| 5,226,041 A | 7/1993 | Waclawsky et al. |
| 5,319,636 A | 6/1994 | Long et al. |
| 5,329,547 A | 7/1994 | Ling |
| 5,343,461 A | 8/1994 | Barton et al. |

(Continued)

FOREIGN PATENT DOCUMENTS

EP          0917314 A2     5/1999

(Continued)

OTHER PUBLICATIONS

Lennart Ljung, IEEE Transactions on Automatic Control, vol. AC-23, No. 5, Oct. 1978, "Convergence Analysis of Parametric Identification Methods", pp 770-783.

(Continued)

*Primary Examiner*—Bing Q. Bui
(74) *Attorney, Agent, or Firm*—Wood, Herron & Evans, L.L.P.

(57) ABSTRACT

Events that occur in a number of in domain communication channels where each channel is used by a communication service, are detected. A Bayesian Belief Network (BBN) defines a probabilistic cause-effect relationship between each cause and each effect on a victim channel. The probability of each of a number of possible causes as being a cause of interference in the victim channel is determined, by propagating observations of the interference backwards through the BBN.

24 Claims, 17 Drawing Sheets

U.S. PATENT DOCUMENTS

| | | | |
|---|---|---|---|
| 5,406,552 | A | 4/1995 | Long et al. |
| 5,521,971 | A | 5/1996 | Key et al. |
| 5,548,222 | A | 8/1996 | Jensen et al. |
| 5,761,614 | A | 6/1998 | Leitch et al. |
| 5,848,151 | A | 12/1998 | Boudy |
| 5,862,157 | A | 1/1999 | Bessios |
| 5,880,959 | A | 3/1999 | Shah et al. |
| 5,887,032 | A | 3/1999 | Cioffi |
| 5,926,538 | A | 7/1999 | Deryugin et al. |
| 5,929,896 | A | 7/1999 | Goodman et al. |
| 5,995,566 | A | 11/1999 | Rickard et al. |
| 6,055,297 | A | 4/2000 | Terry |
| 6,091,713 | A | 7/2000 | Lechleider et al. |
| 6,160,790 | A | 12/2000 | Bremer |
| 6,161,209 | A | 12/2000 | Moher |
| 6,172,970 | B1 | 1/2001 | Ling et al. |
| 6,195,594 | B1 | 2/2001 | Shah et al. |
| 6,215,855 | B1 * | 4/2001 | Schneider ............... 379/22 |
| 6,230,062 | B1 | 5/2001 | Shah |
| 6,249,762 | B1 | 6/2001 | Kirsteins et al. |
| 6,317,495 | B1 | 11/2001 | Gaikwad et al. |
| 6,377,636 | B1 | 4/2002 | Paulraj et al. |
| 6,434,233 | B1 | 8/2002 | Bjarnason et al. |
| 6,442,495 | B1 | 8/2002 | Fleming-Dahl |
| 6,542,465 | B1 * | 4/2003 | Wang ................ 370/232 |
| 6,674,768 | B1 * | 1/2004 | Okamura ............. 370/468 |

FOREIGN PATENT DOCUMENTS

| | | | |
|---|---|---|---|
| EP | 0917314 | A3 | 10/2001 |
| WO | WO098/52312 | A2 | 11/1998 |
| WO | WO098/52312 | A3 | 11/1998 |

OTHER PUBLICATIONS

Sergio Verdu, Cambridge University Press, "Multiuser Detection", 1998, pp 1-26, 56-66, 154-175, 384-387.

Guanghan Xu et al., IEEE Transactions on Singal Processing, vol. 43, No. 12, Dec. 1995, "A Least Squares Approach to Blind Channel Identification", pp 2982-2993.

Alexanda Duel-Hallen et al., IEEE Transactions on Communications, vol. 37, No. 5, May 1989, "Delayed Decision-Feedback Sequence Estimation", pp 428-436.

K. Giridhar et al., IEEE Transactions on Communications, vol. 45, No. 4, Apr. 1997, "Nonlinear Techniques for the Joint Estimation of Cochannel Signals", pp 473-484.

Lang Tong et al., IEEE Transactions on Signal Processing, vol. 47, No. 9, Sep. 1999, "Joint Order Detection and Blind Channel Estimation by Least Squares Smoothing", pp 2345-2355.

Eric Moulines et al., IEEE Transactions on Signal Processing, vol. 43, No. 2, Feb. 1995, "Subspace Methods for the Blind Identification of Multichannel FIR Filters", pp 516-525.

Alexandra Duel-Hallen et al., IEEE Personal Communications, Apr. 1995, "Multiuser Detection for CDMA Systems", pp 46-58.

Upamanyu Madhow et al., IEEE Transactions on Communications, vol. 42, No. 12, Dec. 1994, "MMSE Interference Suppression for Direct-Sequence Spread-Spectrum CDMA" pp 3178-3188.

C. Richard Johnson, Jr. et al., Proceedings of the IEEE, vol. 86, No. 10, Oct. 1998, "Blind Equalization Using the Constant Modulus Criterion: A Review", pp 1927-1950.

P. Ciblat et al., "Asymptotic Analysis of Blind Cyclic Correlation Based Symbol Rate Estimation", Sep. 2000.

Dr. Dennis J. Rauschmayer, Macmillan Technology Series, "ADSL/VDSL Principles", 1999, pp 131-155.

Lennart Ljung, Prentice-Hall Information and System Sciences Series, "System Identification, Theory for the User", 1987, pp 141-163, 239-263.

Yaakov Bar-Shalom et al., Artech House, Inc., "Estimation and Tracking: Principles, Techniques, and Software", 1993, pp 450-465.

International Telecommunication Union, ITU-T Telecommunication Standardization Sector of ITU, G.810, "Definitions and Terminology for Synchronization Networks", Aug. 1996, pp 1-20.

ADSL Forum Technical Report TR-024 for Network Management Working Group, "DMT Line Code Specific MIB", Jun. 1999, pp 1-7.

J. Cioffi, EEE379A, Digital Communication: Signal Processing Class notes, Stanford University, pp. 167-174, 194-197.

Arthur Gelb et al., The Analytic Sciences Corporation, "Applied Optimal Estimation", 1974, pp 156-179.

Simon Haykin, Prentice Hall Information and System Sciences Series, "Adaptive Filter Theory", Third Edition, 1996, pp 772-815.

Ian R. Petersen et al., Control Engineering, "Robust Kalman Filtering for Signal and Systems with Large Uncertainties", 1999, pp 35-55.

Stephen Boyd et al., "Convex Optimization", Course Reader for EE364: Introduction to Convex Optimization with Engineering Applications, Stanford University, Winter Quarter 1996-1997, pp 1-146.

Amit Mathur, Dissertation from Electrical and Computer Engineering, University of California, Santa Barbara, "Algorithms for Cochannel Source Separation and Signal Estimation", Dec. 1996, pp 1-165.

Edward A. Lee et al., Kluwer Academic Publishers, "Digital Communication", Second Edition, 1994, pp 408-424, 468-486.

Thomas Starr et al., Prentice Hall, Communication Engineering and Emerging Technologies, "Understanding Digital Subscriber Line Technology", 1999, pp 297-354.

D. Godard, IEEE Transaction Communications, vol. COM-28, No. 11, Nov. 1980, "Self-Recovering Equalization and Carrier Tracking in Two-Dimensional Data Communication Systems", pp 1867-1875.

Lennart Ljung, PTR Prentice Hall Information and System Sciences Series, "System Identification, Theory for the User", Second Edition, 1999, pp 79-139, 197-279, 317-360.

Raul A. Casas et al., Broadcasting & Cable, "Current Approaches to Blind Decision Feedback Equalization", Aug. 1999, pp 1-52.

John G. Proakis, McGraw Hill Series in Electrical and Computer Engineering, Digital Communications, Third Edition, 1995, pp 267-286.

Craig Michael Teuscher, Dissertation submitted as requirement for the degree of Dr. of Philosophy in Engineering-Electrical Engineering and Computer Sciences, Low Power Receiver Design for Portable RF Applications: Design and Implementation of an Adaptive Multiuser Detector for an Indoor, Wideband CDMA Application, Fall 1998, pp 37, 43-52.

Claes Tidestav et al., Signals and Systems, Uppsala University, "Realizable MIMO Decision Feedback Equalizers", International Conference on Acoustics, Speech, and Signal Processing (ICASSP99) Mar. 1999, Phoenix, AZ, V.5, pp 2591-2594.

K. Sam Shanmugan et al., John Wiley and Sons, "Random Signals, Detection, Estimation and Data Analysis", 1988, pp 341-377.

Harry L. Van Trees, Massachusetts Institute of Technology, "Detection, Estimation, and Modulation Theory", 1968, pp 19-163, 239-418.
PCT Search Report, PCT/US00/42097, Nov. 10, 2000, Date of Mailing: Jun. 26, 2001 (5 pgs.).
PCT Search Report, PCT/US00/30859, Nov. 10, 2000, Date of Mailing: Mar. 27, 2001 (5 pgs.).
PCT Search Report, PCT/US00/30858, Nov. 10, 2000 Date of Mailing: Mar. 16, 2001 (7 pgs.).
PCT Search Report, PCT/US00/30887, Nov. 11, 1999, Date of Mailing: Aug. 9, 2001 (24 pgs.).
PCT Search Report, PCT/US00/30967, Nov. 10, 2000, Date of Mailing: Jan. 24, 2001 (7 pgs.).
PCT Search Report, PCT/US00/31026, Nov. 10, 2000, Date of Mailing: Jan. 22, 2001 (7 pgs.).

Honig, M.L. et al, "Suppression of Near- and Far-End Crosstalk by Linear Pre- and Post-Filtering", Selected Areas in Communications, IEEE Journal on vol. 10 Issue 3, Apr. 1992, pp. 614-629, entire document.
Petersen, Brent R., et al., "Minimum Mean Square Equalization in Cyclostationary and Stationary Interference-Analysis and Subscriber Line Calculations", Student Member, IEEE Journal, vol. 9, No. 6, Aug. 1991, pp. 11.
Valenti, Craig F., Bellcore, "Cable Crosstalk Parameters and Models", ANSI Contribution TIE1.4/97-302 Technical Subcommitte Working Group Members, Spectral Compatibility, Morristown, NJ 07960, USA, Sep. 22, 1997, pp. 8.

* cited by examiner

Event Detection Architecture

METHOD AND APPARATUS FOR IMPAIRMENT DIAGNOSIS IN COMMUNICATION SYSTEMS

This application claims the benefit of the filing date of the following Provisional U.S. Patent Applications:

"SPECTRAL MANAGEMENT AND OPTIMIZATION THROUGH ACCURATE IDENTIFICATION OF CROSS-TALK CHANNELS AND UNCERTAINTY", application No. 60/164,986, filed Nov. 11, 1999;

"SPECTRAL MANAGEMENT AND OPTIMIZATION THROUGH ACCURATE IDENTIFICATION OF CROSS-TALK CHANNELS AND UNCERTAINTY", application No. 60/181,125, filed on Feb. 8, 2000;

"SPECTRAL MANAGEMENT AND OPTIMIZATION THROUGH ACCURATE IDENTIFICATION OF CROSS-TALK CHANNELS AND UNCERTAINTY", application No. 60/183,675, filed on Feb. 18, 2000;

"USE OF UNCERTAINTY IN PHYSICAL LAYER SIGNAL PROCESSING IN COMMUNICATIONS", application No. 60/165,399, filed Nov. 11, 1999;

"METHODS FOR USE OF SPECTRAL INFORMATION IN DMT DSL SYSTEMS", application No. 60/220,074, filed on Jul. 21, 2000;

"A METHOD FOR PROVIDING A PROBABILISTIC MEASURE OF THE LIKELIHOOD OF A CHANGE IN DSL DISTURBER CONFIGURATION", application No. 60/220,075, filed on Jul. 21, 2000;

"EVENT-BASED MODELING OF COMMUNICATION NETWORKS", application No. 60/220,071, filed on Jul. 21, 2000; and "ACTUATION SEQUENCER ALGORITHM IN DSL SYSTEMS", application No. 60/220,078, filed on Jul. 21, 2000

BACKGROUND

This invention is generally related to the detection, diagnosis, and analysis of impairment in a communication system, and more particularly to the use of probabilistic modeling of parameters in the system for detecting and diagnosing the impairment.

In the communications arena one of the biggest challenges is to overcome crosstalk, noise, and other disturbances that impair the signals. Whether the signals are transmitted over wires, cable, fiber optics wireless, or other types of communication, the signals suffer from some level of impairment. The impairment may be due to interference (such as electromagnetic interference from neighboring communication channels) and/or environmental factors (such as temperature and moisture due to rain and snow).

Impairment of the signal may lead to certain limitations of the communication system. For example in wire systems such as digital subscriber lines (DSL), the impairment may shorten the distance at which the signal can be reliably received, i.e., limit loop reach. A similar effect is encountered in wireless systems. Impairment may also decrease the bit rate of the data being transferred. Providers of telecommunications services recognize the need to monitor the quality of service provided to users of their networks and to identify the causes of impairments reported by their customers. This task, however, is complicated significantly by several factors.

Some of these factors include: the large number of network users, the large amount of data collected from the deployed lines, and the presence of competing providers in the same physical line plant. The coexistence of ILECs (incumbent Local Exchange Carriers) and CLECs (Competitive Local Exchange Carriers) in the same cable binders, brought about the federally mandated deregulation of local telecommunications markets, implies that services deployed by one carrier may be disturbing the users of another carrier, who has no information about the source of this disturbance.

It is thus highly desirable to sort through the collected data and determine whether a specific line is being disturbed by, for instance, external interference, such as AM radio stations, or by internal interference, such as another DSL service, and whether that offending service belongs to the same carrier or not. Unfortunately, with today's deployed monitoring technology, carriers are extremely limited in their ability to perform such diagnoses with adequate accuracy and reliability.

BRIEF DESCRIPTION OF THE DRAWINGS

The invention is illustrated by way of example and not by way of limitation in the figures of the accompanying drawings. It should be noted that references to "an" embodiment in this disclosure are not necessarily to the same embodiment, and they mean at least one.

DETAILED DESCRIPTION

Figure 1:
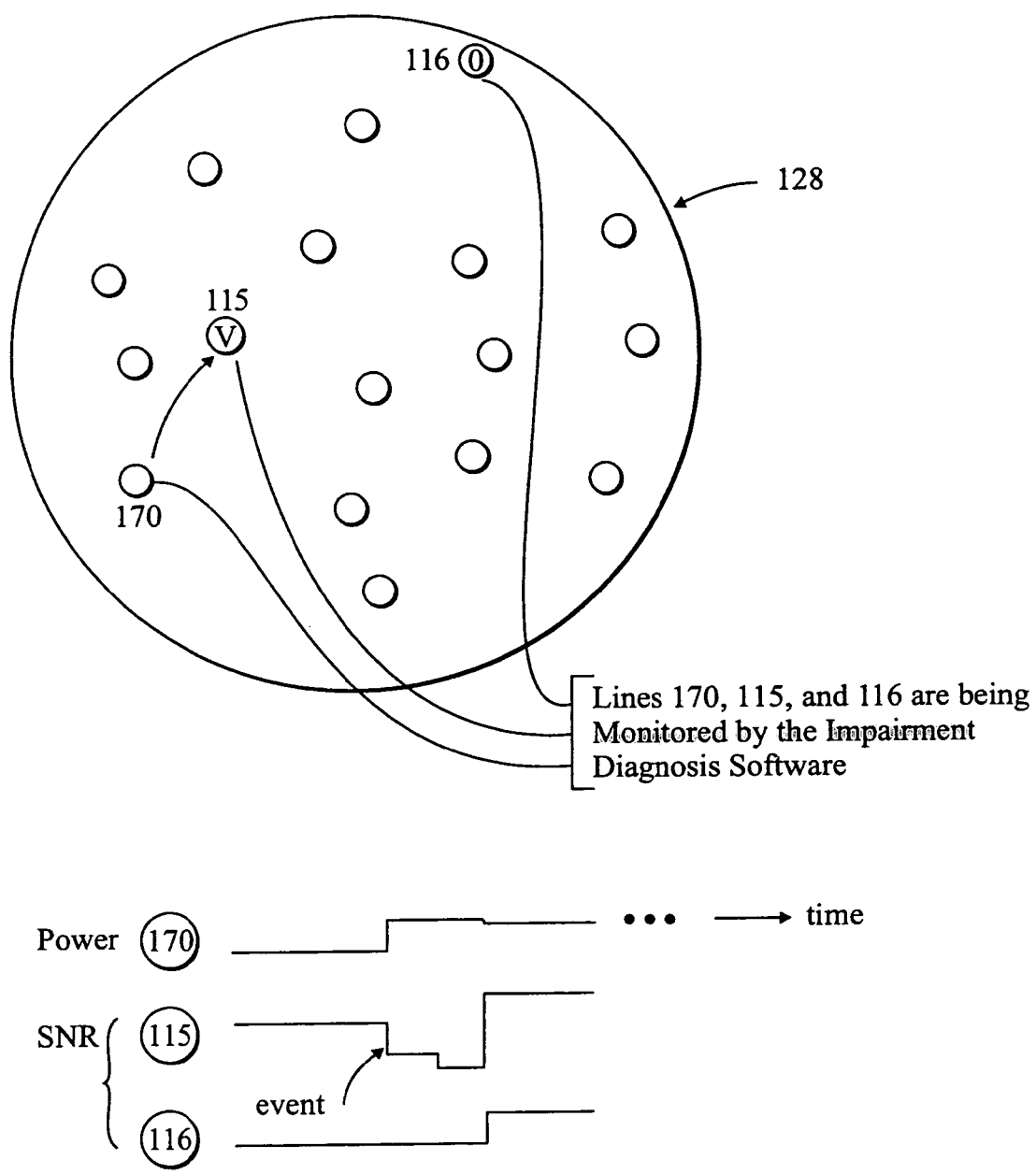
FIG. 1 shows a number of lines in a communications network and several variables being monitored, according to an embodiment of the invention.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

The invention may be used to diagnose a variety of different communication systems, such as those that use twisted wire pairs, optical fiber, cable, as well as wireless channels. Accordingly, the following description of an embodiment of the invention with regard to a digital subscriber line (DSL) application is merely exemplary in that the invention is not limited to the DSL application.

Definitions, Terminology, and Abbreviations

The following definitions and terminology are used in the detailed description below:

channel=a communication path;

event=a change in line data that is deemed significant enough to be considered when diagnosing impairments;

impairment=an adverse effect on communication between two transceivers, deemed to be caused by factors such as interference and environmental conditions;

in-domain=monitored by the detection and diagnosis system;

line=a type of channel characterized by a cable on which the information carrying signal travels (e.g. twisted pair for DSL over plain old telephone service (POTS));

line card=a type of transceiver used in DSL applications; multiple line cards are provided in a DSL access multiplexer (DSLAM);

line data=digitized representation of an information carrying signal or noise, detected in a channel or by a transceiver;

offender or disturber=a source of impairment, e.g. a line, a transceiver who transmits on the line, an amplitude modulation (AM) radio station, a temperature variation;

out-of-domain=not monitored by the detection and diagnosis system;

SNR=signal to noise ratio;

transceiver=transmitter and receiver of an information carrying signal, permitting two-way communication (upstream and downstream), e.g. a modem;

victim=a location where interference with normal signal propagation is felt, e.g. a line, a transceiver on the line.

Overview of General Communication Network

Figure 10:
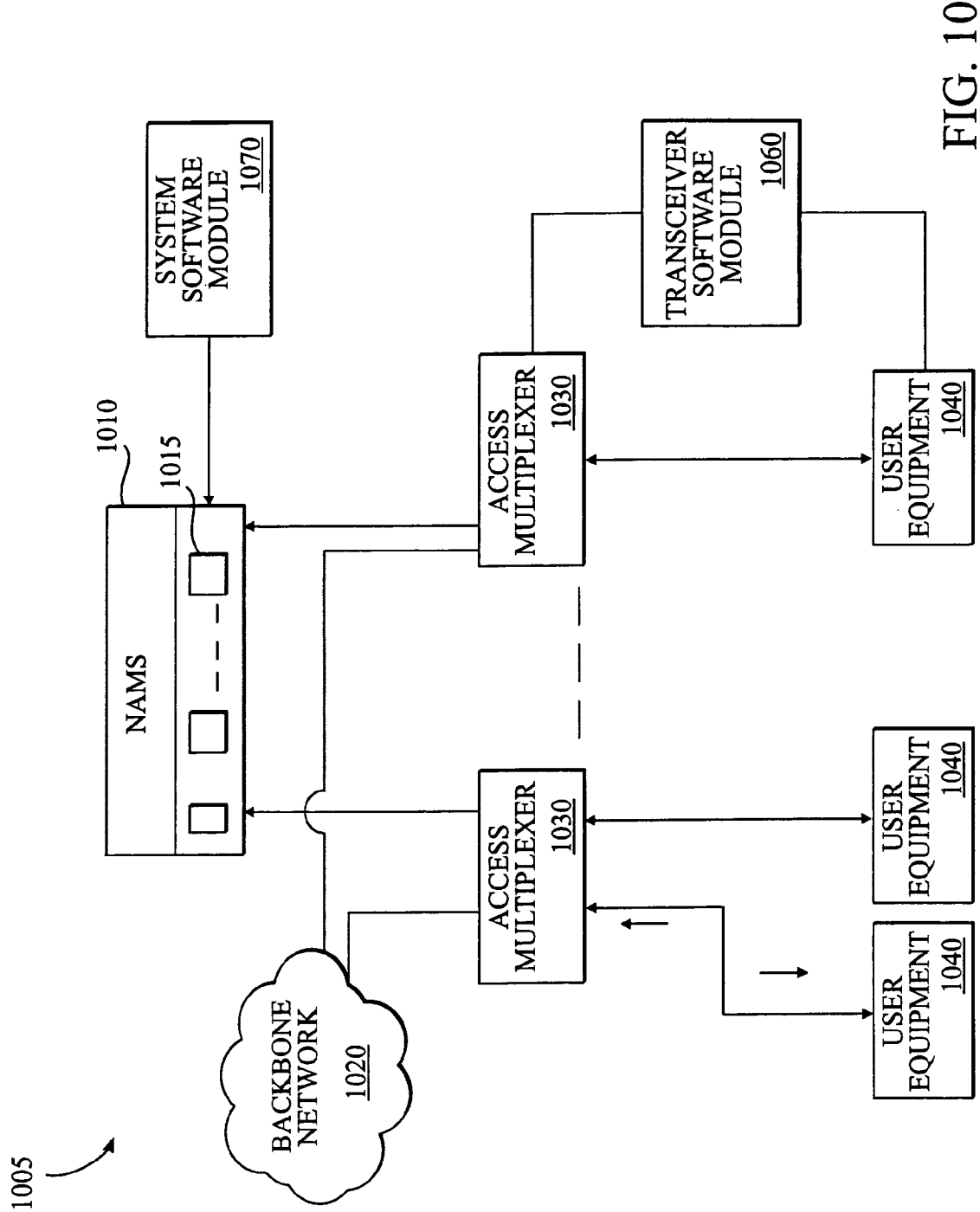
FIG. 10 illustrates a block diagram of an exemplary communication system to be diagnosed according to an embodiment of the invention.

The present invention is applicable to a variety of communication systems, for example: wireline, wireless, cable, and optical. FIG. 10 illustrates an exemplary communication system 1005 that may benefit from the present invention. The backbone network 1020 is generally accessed by a user through a multitude of access multiplexers 1030 such as: base stations, DSLAMs (DSL Access Mulitplexers), or switchboards. The access multiplexers 1030 communicate management data with a Network Access Management System (NAMS) 1010. The NAMS 1010 includes several management agents 1015 which are responsible for monitoring traffic patterns, transmission lines status, etc. Further, the access multiplexers 1030 communicate with the network users. The user equipment 1040 exchanges user information, such as user data and management data, with the access multiplexer 1030 in a downstream and upstream fashion. The upstream data transmission is initiated at the user equipment 1040 such that the user data is transmitted from the user equipment 1040 to the access multiplexer 1030. Conversely, the downstream data is transmitted from the access multiplexer 1030 to the user equipment 1040. User equipment 1040 may consist of various types of receivers that contain modems such as: cable modems, DSL modems, and wireless modems.

The invention described herein provides a method and system for managing the upstream and downstream data in a communication system. As such, the present invention provides management agents that may be implemented in the NAMS 1010, the access multiplexers 1030, and/or the user equipment 1040. One example of such a management agent is a system software module 1070 that may be embedded in the NAMS 1010. Another management agent that manages the data in the communication system 1005 is a transceiver software module 1060 that may be embedded in the access multiplexer 1030 and/or the user equipment 1040. Further details of the operation of modules 1070 and 1060 are described below.

For illustration purposes and in order not to obscure the present invention, an example of a communication system that may implement the present invention is a DSL communication system. As such, the following discussion, including FIG. 11, is useful to provide a general overview of the present invention and how the invention interacts with the architecture of the DSL system.

Overview of DSL Example

The present invention may be implemented in software modules or hardware that DSL equipment manufacturers may then embed in their hardware. Thus, although FIG. 11 illustrates the present invention as software, the present invention should not be limited thereto. It should also be noted that this patent application may only describe a portion or portions of the entire inventive system and that other portions are described in co-pending patent applications filed on even date herewith.

Figure 11:
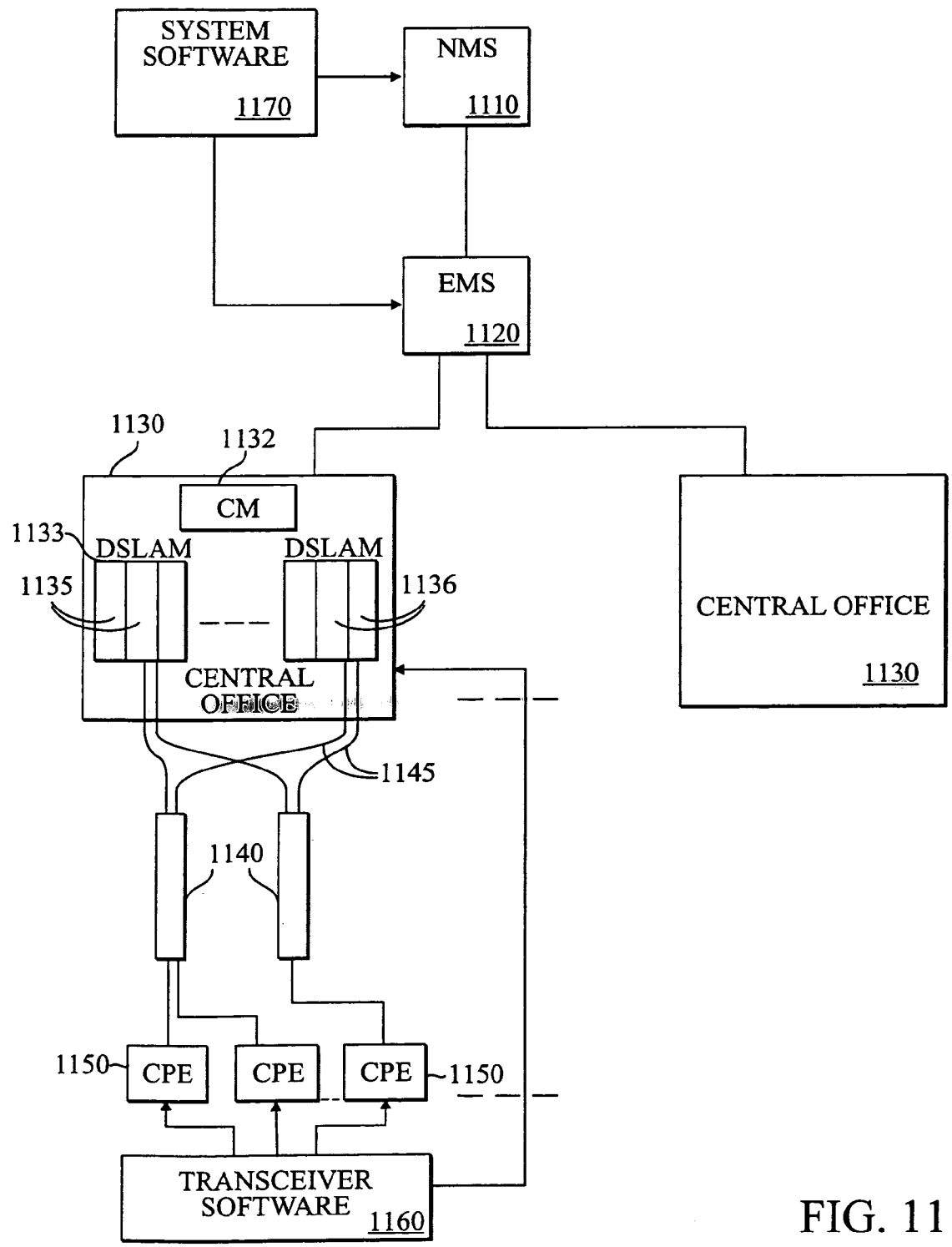
FIG. 11 shows an embodiment of the invention implemented for DSL applications.

FIG. 11 illustrates an exemplary embodiment of the present invention as implemented in a DSL system. The DSL system consists of a network of components starting from the Network Management System (NMS) 1110 all the way down to the Customer Premise Equipment (CPE) 1150. The following is a brief description of how these components are interconnected.

The Network Management System (NMS) 1110 is a very high level component that monitors and controls various aspects of the DSL system through an Element Management System (EMS) 1120. The NMS 1110 may be connected to several Central Offices (CO) 1130 through any number of EMSs 1120. The EMS 1120 effectively distributes the control information from the NMS 1110 to the DSL Access Multiplexers (DSLAMs) 1133 and forwards to the NMS 1110 network performance or network status indicia from the DSLAMs 1133. DSLAMs 1133 reside in a Central Office (CO) 1130, usually of a telecommunications company. Alternatively, DSLAMs 1133 may reside in remote enclosures called Digital Loop Carriers (DLC). The CO 1130 may have tens or hundreds of DSLAMs 1133 and control modules (CM) 1132. A DSLAM 1133 operates as a distributor of DSL service and includes line cards 1135 and 1136 that contain CO modems. The CO modems are connected to at least one line 1145, but more frequently it contains several line cards 1135 and 1136 that are connected to several lines 1145. Usually the lines 1145 are traditional phone lines that consist of twisted wire pairs and there may be multiple lines 1145 in a binder 1140 and multiple binders in a cable. The transmission cables act as packaging and protection for the lines 1145 until the lines 1145 reach the Customer Premise Equipment (CPE) 1150. It should be noted that a DSLAM 1135 does not necessarily have to be connected to lines 1145 in a single binder 1140 and may be connected to lines in multiple binders 1140. The lines 1145 terminate at the CPE 1150 in transceivers that include CPE modems. The CPE 1150 may be part of or connected to residential equipment, for example a personal computer, and/or business equipment, for example a computer system network.

As discussed in the background section, communications systems often suffer from interference and/or impairments such as crosstalk, AM radio, power ingress noise, thermal variations, and/or other "noise" disturbers. The present invention or portions of the present invention provide the user the capability to analyze, diagnose and/or compensate for these interferences and/or impairments. It also provides the ability to predict and optimize performance of the communication system in the face of impairments.

As illustrated in FIG. 11, the transceiver software 1160, depending upon how implemented, may provide the user with the ability to analyze, diagnose, and compensate for the interference and/or impairment patterns that may affect their line.

Also as illustrated in FIG. 11, the system software 1170 of the present invention, depending upon how implemented, may provide the service provider with the ability to diagnose, analyze, and compensate for the interference and/or impairment patterns that may affect the service they are providing on a particular line. The diagnosis and analysis of the transceiver software 1160 also provide the ability to monitor other transmission lines that are not connected to the DSLAMs or NMS but share the same binders.

It should be noted that the system software 1170 of the present invention may be implemented in whole or in part on the NMS 1110 and/or EMS 1120 depending upon the preference of the particular service provider. Likewise, it should be noted that the transceiver software 1160 may be implemented in whole or in part on the DSLAM 1133 and/or transceivers of CPE 1150 depending upon the preference of the particular user. Thus, the particular implementation of the present invention may vary, and depending upon how implemented, may provide a variety of different benefits to the user and/or service provider.

It should also be noted that the system software 1170 of the present invention and the transceiver software 1160 may operate separately or may operate in conjunction with one another for improved benefits. As such, the transceiver software 1160 may provide diagnostic assistance to the system software of the present invention 1170. Additionally, the system software of the present invention 1170 may provide compensation assistance to the transceiver software 1160.

Thus, given the implementation of the present invention with respect to the DSL system example of FIG. 11, one of ordinary skill in the communications art would understand how the present invention may also be implemented in other communications systems, for example: wireline, wireless, cable, optical, and other communication systems. Further details of the present invention are provided below. Additional examples of how the present invention may be implemented in a DSL system are also provided below for illustrative purposes.

Introduction to Impairment Diagnosis

As can be seen from the description of the general communications system and in particular the DSL system, there may be a large number of individual services that operate over the network. Considering that the information being monitored includes thousands of digitized carrier signals, an unmanageably large amount of raw data is captured by the individual line processors. The technique described below exhibits a multi-layer processing architecture that makes the task of detection and diagnosis from such a large amount of information much more manageable and therefore practical. The multi-layer processing helps not only reduce the raw data into events that are analyzed in the upper processing layers, but also allows parallel processing to occur on what is estimated as being unrelated groups of events.

The impairment that is diagnosed may be an increase in the noise or a distortion of the carrier signal detected at a transceiver. The impairment may be due to any one of a number of causes, including crosstalk from other lines and EMI from a broadcast station or electrical appliance. Also, signal attenuation may be due to changes in the physical properties of the channel, such as temperature and moisture variations.

This degradation has the effect of limiting the range and/or data transmission rate of the channels, which translates to lost potential revenue for a communication service provider. For instance, in the DSL application, these problems are exacerbated as the penetration of a DSL network is increased, which directly increases the potential for crosstalk interaction. Additionally, if more than one DSL service provider has access to copper loops from the same binder, the sources of the crosstalk may not be immediately obvious since the information about the total number and types of services that are deployed in a binder are not available.

Since, among other reasons, a service provider seeks to provide a guaranteed transmission rate for its customers, it is in its interest to be able to detect and diagnose a significant and persistent service impairment as quickly and cheaply as possible. For example, the ability to quickly detect crosstalk from lines that are monitored by a detection and diagnosis system within a DSL service provider's equipment (in-domain lines) and from unmonitored lines (out-of-domain) is highly desirable. A method according to an embodiment of the invention by which the crosstalk is detected and diagnosed includes the identification of the physical and operational properties of the network. Such properties include:

the groupings of DSL services into noninteracting sets, the near-end crosstalk transfer functions or coupling coefficients between DSL services, the knowledge of the service types and operating modes for both in-domain and out-of-domain DSL services.

Some of this information is available directly from the DSL transceivers (e.g. transmitted or received total signal power in a given frequency range), and in other cases it may be extracted from measurements on the DSL transceivers (e.g. for an in-domain service, and the type and rate of an out-of-domain service). Often, the available data is incomplete or unavailable, such as line data from unmonitored out-of-domain lines or a lack of binder construction information, i.e. identifying lines that are in the same binder. In such a case, probabilistic descriptions of the information are constructed. This results in some level of inherent uncertainty, which leads to errors in the detection and diagnosis of service impairments. Fortunately, a number of stochastic techniques are used in the embodiments of the invention, to mitigate the uncertainty so as to maximize the utility of the diagnoses. These are discussed in detail in the following sections.

Overview of Event Detection, Diagnosis, and Analysis

The description below will begin with section I. Training, which is a procedure for the system to learn about the couplings between in-domain channels that are being monitored. The next section, II. Event Detection, describes a lower level processing layer for detecting events in the presence of a large amount of data, noise, and uncertainty. The next higher processing layer is in section III. Event Clustering, in which related event logs are grouped together into an event list, for further data reduction. The event lists are analyzed in section IV. Event Analysis, to achieve the desired result which, according to an embodiment of the invention, is a report showing a breakdown of the estimated contribution to an impairment by one or more offenders, such as the following example for a DSL application:

Impairment on victim line #15

| Possible Offenders: | | |
|---|---|---|
| | Contribution | Range/Uncertainty |
| In-domain | | |
| Line 970 | 20% | 0.2 |
| AM radio station | 10% | 0.2 |
| 2 Out-of-Domain | | |
| Disturber DSL (type S) | 30% | 0.3 |
| Disturber DSL (type S) | 10% | 0.3 |

Other types of reports may be generated, depending upon the application. For instance, in the DSL application, the report may include an analysis of the type of activity of all diagnosed out-of-domain and in-domain offenders and victims that are estimated to be in a given binder. Since twisted pair lines in a binder often terminate in a small geographical area of users, e.g. within several hundred feet, such a report may also provide information regarding services deployed by other carriers in that small geographical area.

The use of Event Clustering to group related events into one list has several advantages. The time-stamping of channel data (for detecting events) need not have a fine temporal resolution. In other words, it may not be necessary, for the diagnosis function to yield a reliable breakdown of the likelihood of different causes for an impairment, for the system to know that one event occurred just prior to another event in a list. This is desirable because in some applications, the mechanisms for time-stamping are not synchronized. For instance, in the DSL application, events may be detected by different DSL access multiplexers (DSLAMs) which are often not synchronized. Another advantage of the clustering is that the sampling of the channel data can be relatively infrequent. Once again, it may not be necessary, for accurate diagnosis, to capture a transition in SNR with fine temporal resolution.

Another advantageous feature provided by an embodiment of the invention is the ability to diagnose the contribution to an impairment by multiple disturbers, as opposed to just a single disturber. The probabilistic models used by Event Analysis allow more than one cause to be postulated, such as multiple disturber types or multiple lines. This is also extended to allow out-of-domain offenders to be postulated as the cause of an impairment.

Yet another advantageous feature of an embodiment of the invention lies in the ability to diagnose with relatively sparse observations, thereby making more tractable the problem of diagnosing a large, complex network. Instead of requiring full spectral information concerning an event, certain embodiments of the invention analyze events with very sparse information, such as just a single, 'aggregate SNR' value (computed over the entire spectrum of a communication channel.) For instance, the probabilistic cause-effect models in such a case may only specify the relationship between a change in operating mode of a certain offender and an expected change in the aggregate SNR. The observations that would be gathered in such a case would be mostly aggregate SNR values in victims at the time of an impairment, rather than full spectral information from each victim. This use of 'aggregate' information rather than full spectral information may be used to diagnose impairments that are caused by either a single disturber or multiple disturbers.

For an example of the set up and configuration of model designs, see U.S. patent application entitled "Design and Architecture of an Impairment Diagnosis System for Use in Communication Systems", filed on even date herewith and assigned the assignee herein.

I. Training

The network which is being monitored for crosstalk interference is modeled by certain parameterizations that need to be learned. One of these parameterizations is the grouping of channels in the network. This grouping is designed to ensure that a service from one set does not interact with a service from another set, or in other words the probability of services from one set interfering with services in another set is very low. Once the services have been grouped in this manner, cause and effect relationships can be more easily determined between simultaneous events.

Referring to FIG. 1, a portion of such a network is shown for which it is desirable to determine for just a single victim channel 115 the probability of that channel being affected or interfered with by an offender channel 170. The channels in this example may be POTS lines (twisted copper pairs) that are in the same binder 128. Assume that event 1, being a reduction in signal to noise ratio (SNR), has been detected in channel 115 (victim) at a given time. Since channel 170 also reports a change in transmit power at about the same time, an initial guess would be that channels 170 and 115 are in the same set or grouping, i.e. they are coupled. Also, since channel 116 reports no change in SNR at the subject time, a guess here would be that channels 116 and 170 are not in the same grouping. This procedure may be expanded to (1) improve the confidence in each coupling estimate, and (2) expand the range of coupling estimates to as much of the monitored portion of the network as possible, by monitoring events and causes on as many victims and potential offenders as possible. Correlation between victims, such as their difference in SNR change, can also be used to indicate coupling between these victims. Effects on out-of-domain offenders (not shown in FIG. 1) can be postulated based on in-domain activity; such hypotheses can be tested for accuracy as described below in Event Analysis, the section entitled "Hypothesis Testing".

Figure 2:
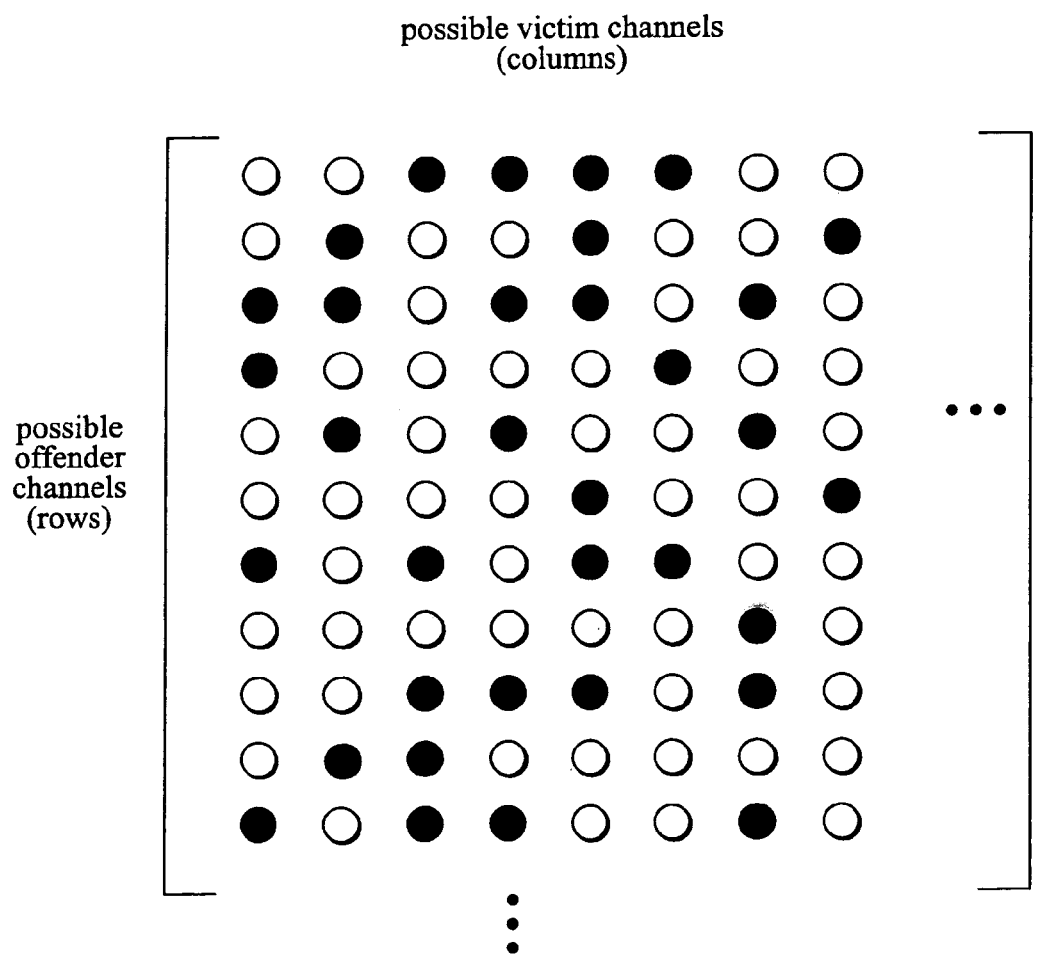
FIG. 2 depicts a connectivity matrix of an embodiment of the invention.
Figure 3A:
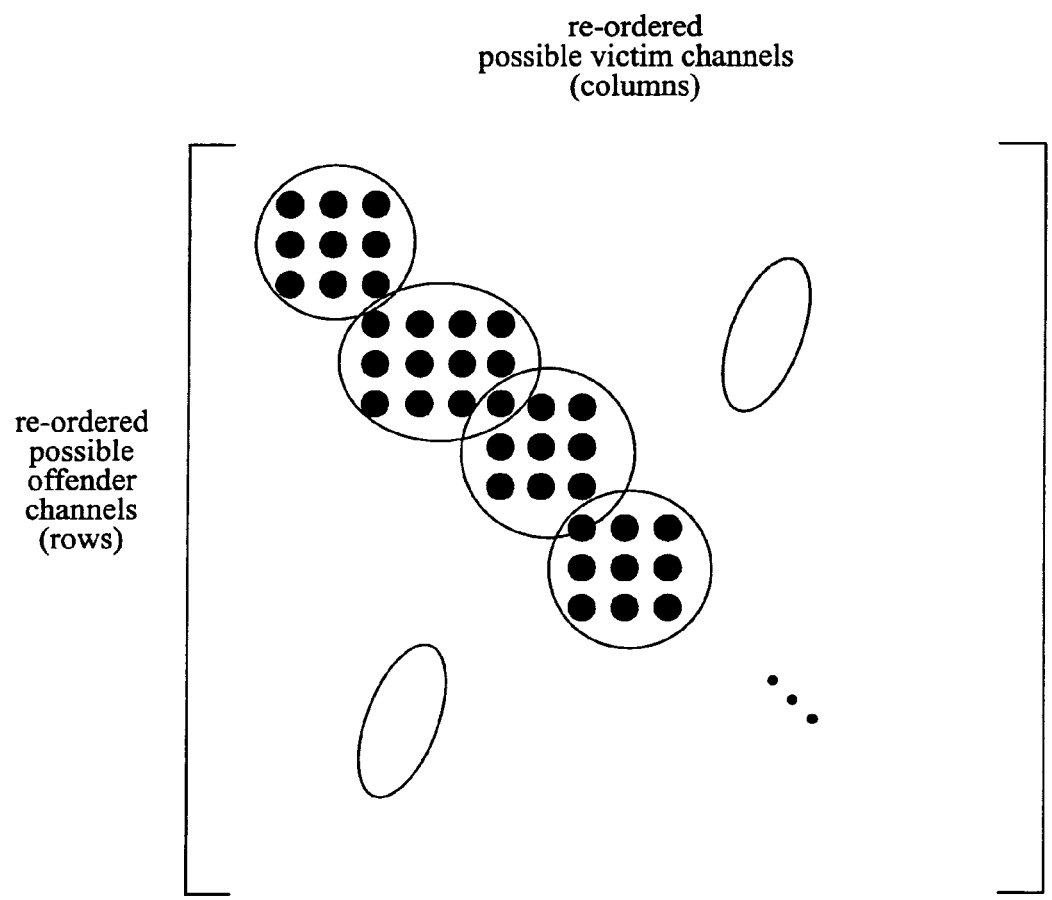
FIG. 3A depicts a re-ordered connectivity matrix that shows groupings of correlated lines.

FIG. 2 shows a connectivity matrix, which is a representation of the possibility (solid circle) or lack thereof (empty circle) of coupling between channels, as determined by the time correlation method described in the paragraph above. Note that there is no particular ordering to the matrix elements shown here. Sparse matrix re-ordering algorithms may be applied to this unordered matrix to readily reveal additional groupings between lines. The results of such an algorithm are depicted in FIG. 3A where the matrix is now diagonal, such that only the diagonal elements shown by solid circles are non-zero. The grouping of channels may be indicated by the envelope circles around each group of matrix elements. The offender channels that correspond to the rows which intersect an envelope circle are the channels in which communication is likely to interfere with or disturb the victim channels that correspond to the columns which intersect the envelope circle. Note that the strength of this coupling is given by the intersecting matrix element. This element may be of a variety of different forms, including a single number, or a transfer function represented by a probability mass function. The actual value or function may be determined according to the techniques described below in Event Analysis, the section entitled "Model Synthesis".

According to an embodiment of the invention, the time correlation may be tailored for grouping POTS twisted pairs as used by DSL services. In such an embodiment, each grouping of the diagonal elements of the connectivity matrix may roughly correspond to a binder in which the intersecting victim and offender twisted pair lines are located. Further details of an embodiment of the time correlation operation are now described.

If the physical configuration of the network does not change frequently, as is commonly the case, a change on a particular offender is likely to always affect the same victims. Over time, correlation between observations from offenders and victims may be built. By restricting analysis to events and the associated observations, the amount of analysis is drastically reduced. For large networks, this makes a large and complex problem tractable. There may be at least two reasons for this, the sparse coupling between channels and the relatively low rate of events.

Normally, only a few offenders affect a victim in any significant way—otherwise the operation of the network may be difficult. Therefore, the event correlation drastically reduces the amount of coupling that needs to be considered. For example, each channel in a network of 1,000 channels potentially has 999 offenders, giving rise to 999,000 individual crosstalk models that need to be identified. However, in practice, a typical victim may only be significantly affected by five offenders, requiring only 5,000 individual crosstalk models. This is indicated by the events, since whenever a particular offender changes its transmitted signal, only 5 or so victims show a change in the received signal.

Note also that the number of offenders per victim usually does not change significantly with the size of the network. Therefore, a channel in a network with 10,000 channels may have the same five offenders as the same channel in a 1,000-channel network. The net result is that only a very low number of crosstalk models needs to be identified at any one time.

Complexity is further reduced because significant events normally do not happen very frequently. In other words, the probability of simultaneous offenders is low, so whenever events are observed on a victim, it is likely that they are all related to the same offender. Therefore, in the example above, it may be expected that only about five changes are observed at the same time in most cases. By correlating the events over time, any simultaneous offenders may be separated. An embodiment of such a technique is described below for a DSL application, although the technique may alternatively be used to determine the connectivity matrix of other communication system applications.

A method of grouping the services into non-interacting groups is described as follows. At least two types of inputs are defined. The first type of input is a report from a DSL service being monitored that it has changed mode in such a way that a change in the noise level on a coupled service may be expected. The second is the report from a DSL service being monitored that experienced a change in its noise level. The following definitions apply here:

n: The number of DSL services being monitored.

A: An n by n connectivity matrix whose i,j th element describes the likelihood of coupling between the ith and jth service being monitored.

B: A copy of A used for estimating the likelihood of coupling between the ith and jth service being monitored.

C: Matrix B reordered by elementary symmetric row and column swapping.

R: A list of services that have reported mode changes that can lead to noise measurement changes on coupled services in the time interval $T=t\beta[T, T+dT]$, where $dT$ a small length of time on the order of one to a small number of sampling periods. The list R is a vector whose entries correspond to the index of the services reporting mode changes.

M: A list of services that have significant changes in the measured levels of noise the time interval $T=t\beta[T, T+dT]$. The list M is a vector whose entries correspond to the index of the services reporting measurable levels of noise changes.

p: A scalar which is used as a threshold for deciding which elements of B are statistically significant.

Initialization

Set A=0.

State Update

For each time period dT
1. add one to the diagonal element of A corresponding to each element in 2. add one to the elements of A whose row index corresponds to the elements in R and whose column index corresponds to the elements in M.

Coupling Estimate

1. Set B=A.
2. Divide the rows of B by their diagonal element if the diagonal element is non-zero.
3. Set $B=B+B^T$
4. Set all elements of B<p equal to zero.
5. All non-zero elements are assumed to have significant coupling to one another.

Grouping

Apply a symmetric sparse matrix reordering algorithm like the reverse Cuthill-McKee or Minimum Degree algorithm to produce a reordering of the matrix B (and therefore A) groups services into noninteracting groups. This will produce the matrix C, which has low bandwidth and uncoupled blocks on the diagonal.

EXAMPLE

Following is an example of four steps of the coupling identification algorithm described above. In this example, there are three services and services 1 and 2 are coupled to one another.

Define $dT=1$, $T_0=0$, $n=3$, $p=0.25$

Measure

R(0)=[1,3], M(0)=[2],
R(1)=[1], M(1)=[2],
R(2)=[2], M(2)=[1],
R(3)=[3], M(3)=[ ].

Initialize

A(0)=0.

State Update

T=0
A(1,1)=A(1,1)+1=1
A(3,3)=A(3,3)+1=1
A(1,2)=A(1,2)+1=1
A(3,2)=A(3,2)+1=1
T=1
A(1,1)=A(1,1)+1=2
A(1,2)=A(1,2)+1=2
T=2
A(2,2)=A(2,2)+1=1
A(2,1)=A(2,1)+1=1
T=3
A(3,3) A(3,3)+1=2

Coupling Estimate $$B = \begin{bmatrix} 2 & 2 & 0 \\ 1 & 1 & 0 \\ 0 & 1 & 2 \end{bmatrix} (B = A)$$

$$B = \begin{bmatrix} 1 & 1 & 0 \\ 1 & 1 & 0 \\ 0 & \frac{1}{2} & 1 \end{bmatrix} \text{(Normalize)}$$

$$B = \begin{bmatrix} 2 & 2 & 0 \\ 2 & 2 & \frac{1}{2} \\ 0 & \frac{1}{2} & 2 \end{bmatrix} (B = B + B^T)$$

$$B = \begin{bmatrix} 2 & 2 & 0 \\ 2 & 2 & 0 \\ 0 & 0 & 2 \end{bmatrix} \text{(Threshold)}$$

Grouping $$C = \begin{bmatrix} 2 & 2 & 0 \\ 2 & 2 & 0 \\ 0 & 0 & 2 \end{bmatrix}$$

Conclusion: Services 1 and 2 are coupled to each other and service 3 is uncoupled to services 1 and 2.

Instead of adding one to the off-diagonal elements in the state update, it may be possible to add a measure of the coupling derived from a parameter estimation routine, where the measure is a value between 0 and 1.

As an alternative to the embodiment depicted above in which the connectivity matrix A is initialized, a pre-initialization step may be performed in which a matrix $A_0$, an initial estimate of the connectivity matrix, is derived from the twisted-pair binder information, if available. Such information may be obtained from local telephone companies. Initially, set $A_0(i, i) = 1$ for all i mapped to in-domain lines $A_0(i, j) = n_d/n_b$, if the ith and jth service are in the same binder, where $n_d$ is the average number of disturbers per binder and $n_b$ is the number of lines per binder $A_0(i, j) = 0$ if the ith and jth service are not in the same binder.

Now continue with initialization procedure as described earlier by setting $A = A_0$.

A. Forced Training

To further speed up the process of identifying the existence of coupling between channels, certain predefined combinations of in-domain channels may be forced to change their operating modes (e.g. on to off) for short periods of time, and the effects of these forced combinations on in-domain channels may be examined, to more efficiently determine the existence of coupling. Applying such deterministic stimuli, also referred to as forcing the actuation in the network, may be performed at off peak hours of service usage so as to minimize the down time of services during the peak hours. An embodiment of the forced actuation procedure is described as follows.

The response of a system (which models a portion of the plant or network) to a set of n linearly independent inputs is desired, where n denotes the number of inputs (these inputs form a basis). Each input is applied to the system for a sufficiently long period of time. In DSL systems, depending on the service type, there are a finite number of available input modes, defined as training/retraining mode, showtime (active mode), idle mode, etc. Each mode has a specific power spectral density. According to an embodiment of the invention, an appropriate combination of inputs is determined, and then the mode changes are applied sequentially and in suitable combinations to identify the system by processing the resulting outputs. The a priori knowledge about the dynamics of the line being actuated indicates that each mode change should last a few seconds for identification purposes.

The aforementioned set of linearly independent input vectors may be chosen from different combinations of input modes in order to create this set. However, each combination has some advantages and disadvantages, which will be discussed later. Note that a central office (CO) may provide service for thousands of customers, which means that the connectivity matrix may consist of millions of transfer functions in general. A symmetric matrix reordering approach has been disclosed to reduce the complexity of the problem by constructing an initial estimate of the binder configuration across the line plant. This method can be used in parallel with the actuation sequencer scheme to reduce the number of transfer functions in the matrix that is required to be identified. In other words, the input and output data corresponding to the sequencer actuation can also be used for a connectivity matrix approach simultaneously. The scheme includes at least the following three steps:

Step 1: Instruct lines to go into the idle mode one at a time for a short while (typically a few seconds); observe the corresponding SNR increase on other lines. This increase in SNR of a line represents the interaction between that line and the line that was forced to go into idle mode. Use a connectivity matrix approach to construct an initial estimate of the binder configuration across the line plant using this data. This changes the structure of the matrix to a block diagonal matrix, with off-diagonal zeros representing weakly interacting lines. Note that this step is for simplifying the problem only and can be skipped if there is a priori knowledge about the binder configuration, or if the complexity of the identification process is not a concern.

The sequence of mode changes described above may vary. In other words, a subset of the lines may be instructed to go into idle mode and other subsets to go into training and active mode for a short while, and repeat other combinations, until a set of linearly independent input vectors are examined.

Step 2: Use the data collected in Step 1 to identify the non-zero elements of the matrix. Since the set of inputs used in Step 1 represents a basis, there is no need to force a new mode change. However, one can selectively inject new inputs to improve the estimates of the transfer functions. For instance, by forcing all lines except line number i to go into the idle mode, while line number i is in the active mode, the ith column and ith row of the matrix can be significantly improved, which represent the main channel number i and cross-coupling between this channel and all other lines. Note that any advanced system identification method can be used in this step. One can also use Kalman filtering methods to minimize the effect of external disturbances. At the end of this stage, a reasonable estimate of the connectivity matrix will be available.

Step 3: Use the natural input and output signals to improve the estimates and go to Step 1 if a new DSL service is added or the cable configuration is changed.

Figures 3B, 3C:
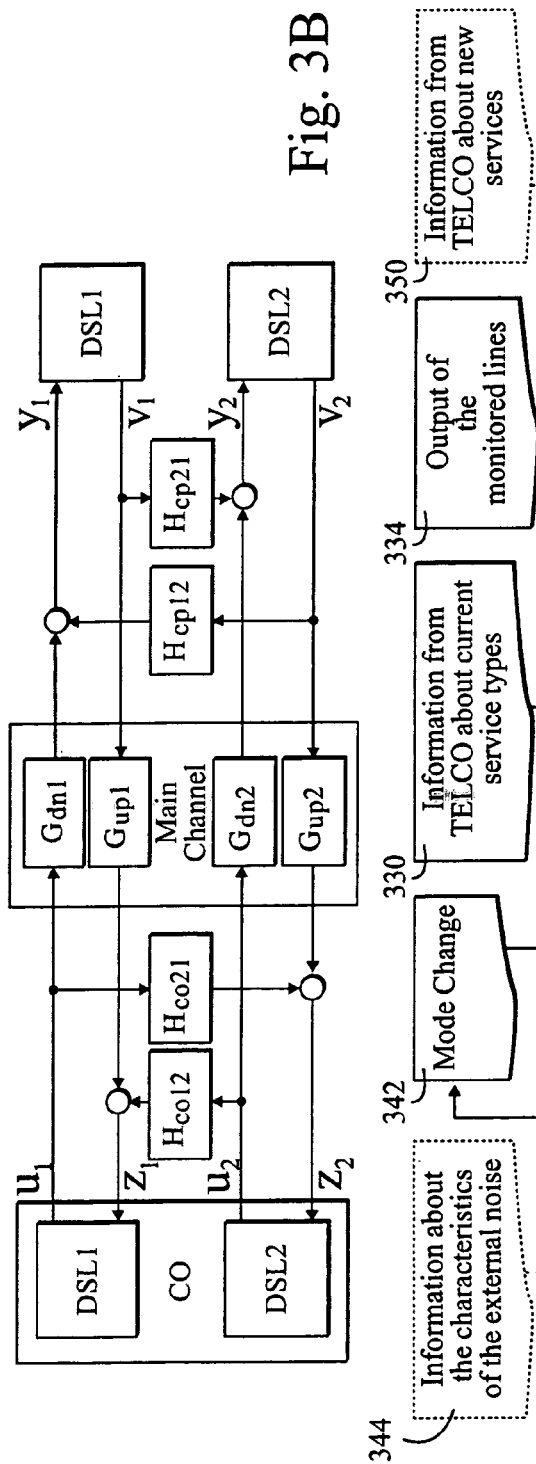
FIG. 3B shows a block diagram of two coupled lines being used for an embodiment of the forced actuation scheme.
FIG. 3C illustrates a flow diagram of an embodiment of the forced actuation scheme.

Example: Consider a transmission line with two DSL transceivers attached. A block diagram of this system is depicted in FIG. 3B. The operations shown in a flowchart of an embodiment the actuation sequencer scheme given in FIG. 3C are also described concurrently. Note that the dotted blocks in this figure denote optional information or steps in the actuation sequencer process.

$u_1$ and $u_2$ represent the downstream signal transmitted by the CO, and $y_1$ and $y_2$ represent the corresponding signals received at the customer premises equipment (CPE) side. Similarly, $v_1$, $v_2$ and $z_1$, $z_2$ denote the upstream signals transmitted by the CPE and received by the CO, respectively, as in operation 334. A goal here is to identify the transfer functions $G_{dn1}$, $G_{up1}$, $G_{dn2}$, $G_{up2}$ (which represent the main channel), $H_{co12}$, $H_{co21}$, $H_{cp12}$ and $H_{cp21}$ (which represent the near end crosstalk (NEXT) transfer functions). For simplicity of this example, the far end crosstalk (FEXT) transfer functions (which are typically weak), and the external noise (AM interference and thermal effect), are ignored here. The input-output relation between these signals is given by:

$$\begin{bmatrix} y_1 \\ z_2 \\ y_2 \\ z_1 \end{bmatrix} = \begin{bmatrix} G_{dn1} & H_{cp12} & 0 & 0 \\ H_{co21} & G_{up2} & 0 & 0 \\ 0 & 0 & G_{dn2} & H_{cp21} \\ 0 & 0 & H_{co12} & G_{up1} \end{bmatrix} \begin{bmatrix} u_1 \\ v_2 \\ u_2 \\ v_1 \end{bmatrix}.$$

Assume that the set of 4 linearly independent input vectors, as in operation 338, is given by:

$$\begin{bmatrix} u_{11} \\ v_{21} \\ u_{21} \\ v_{11} \end{bmatrix}, \begin{bmatrix} u_{12} \\ v_{22} \\ u_{22} \\ v_{12} \end{bmatrix}, \begin{bmatrix} u_{13} \\ v_{23} \\ u_{23} \\ v_{13} \end{bmatrix}, \begin{bmatrix} u_{14} \\ v_{24} \\ u_{24} \\ v_{14} \end{bmatrix},$$

and the corresponding output vectors:

$$\begin{bmatrix} y_{11} \\ z_{21} \\ y_{21} \\ z_{11} \end{bmatrix}, \begin{bmatrix} y_{12} \\ z_{22} \\ y_{22} \\ z_{12} \end{bmatrix}, \begin{bmatrix} y_{13} \\ z_{23} \\ y_{23} \\ z_{13} \end{bmatrix}, \begin{bmatrix} y_{14} \\ z_{24} \\ y_{24} \\ z_{14} \end{bmatrix}.$$

The initial estimate of the transfer matrix is given by the following equation:

$$\begin{bmatrix} G_{dn1} & H_{cp12} & 0 & 0 \\ H_{co21} & G_{up2} & 0 & 0 \\ 0 & 0 & G_{dn2} & H_{cp21} \\ 0 & 0 & H_{co12} & G_{up1} \end{bmatrix} = \begin{bmatrix} y_{11} & y_{12} & y_{13} & y_{14} \\ z_{21} & z_{22} & z_{23} & z_{24} \\ y_{21} & y_{22} & y_{23} & y_{24} \\ z_{11} & z_{12} & z_{13} & z_{14} \end{bmatrix} \begin{bmatrix} u_{11} & u_{12} & u_{13} & u_{14} \\ v_{21} & v_{22} & v_{23} & v_{24} \\ u_{21} & u_{22} & u_{23} & u_{24} \\ v_{11} & v_{12} & v_{13} & v_{14} \end{bmatrix}^{-1}.$$

It is to be noted that in order to have more accurate initial estimate, a set of 4 linearly independent input vectors may be chosen. Each set has its own advantages and disadvantages. For example consider the following input vectors:

$$\begin{bmatrix} U_{11} \\ 0 \\ 0 \\ 0 \end{bmatrix}, \begin{bmatrix} 0 \\ V_{22} \\ 0 \\ 0 \end{bmatrix}, \begin{bmatrix} 0 \\ 0 \\ U_{23} \\ 0 \end{bmatrix}, \begin{bmatrix} 0 \\ 0 \\ 0 \\ V_{14} \end{bmatrix}.$$

These vectors represent a sequence of mode changes that activates the lines one at a time, as provided by operation 342, while other lines are forced to go into idle. Note that this is an orthogonal set, which in the absence of noise, provides rich information about the characteristics of the line because each time one of the input vectors is applied, all observed signals in the other lines at CPE will represent the effect of the corresponding NEXT transfer functions. Another alternative to the set of input vectors is given by:

$$\begin{bmatrix} 0 \\ V_{21} \\ U_{21} \\ V_{11} \end{bmatrix}, \begin{bmatrix} U_{12} \\ 0 \\ U_{22} \\ V_{12} \end{bmatrix}, \begin{bmatrix} U_{13} \\ V_{23} \\ 0 \\ V_{13} \end{bmatrix}, \begin{bmatrix} U_{14} \\ V_{24} \\ U_{24} \\ 0 \end{bmatrix}.$$

These vectors represent a sequence that requires forcing the lines to go into idle, only one at a time, which will be less destructive for customers of communication service providers.

The capital letters in the input vectors in the given example denote functions of frequency. This implies that for the transfer functions corresponding to each frequency should be obtained by using the matrix inversion shown in the example.

It should be noted that a bin selection method may be used to reduce the computation volume, by identifying the matrix over a limited number of frequency ranges only.

It is to be noted that once one line is forced to change its mode, both modems at CO and CPE will go through a sequence of events until it stabilizes. This means that some of the input vectors will be correlated in time. For instance, in the given example, once the signal $u_1$ goes into idle, it will force the signal $v_1$ to go through some changes as well, which should be considered in the identification process.

This example illustrates that the choice of linearly independent input vectors is a tradeoff between customer service disruption and accuracy of the identification results. However, the lines can be instructed to go into different modes in certain time periods that the line is most likely not used by the customer (e.g. after midnight), or a supervisory technique can be used to observe the lines that are not in use at a given time.

In the given example, it was assumed that the system is deterministic with no external noise. In the general case, however, a set of optimal input vectors for system identification can be obtained by taking the effect of all sources of external noise into account, as well as the current state of the system identification process. This system identification process may be based on a recursive least squares (RLS) or a Kalman filter approach to parameter estimation. Since an RLS algorithm explicitly updates either an information matrix ● or the covariance matrix ●●-● relating the input and output measurements, it is possible to improve the quality of the parameter identification by examining the external singular vectors of ●● or ●●-●●● Since a parameter estimate produced by an RLS identification process is more accurate when the condition number of ●● is small, the actuation sequence may be adjusted to increase the component of ● along the minimum singular vector or to decrease the component of ●●-● along the maximum singular vector. This provides a means for deciding on the fly how to adjust the excitation of the system to minimize the covariance of the identified parameters given a fixed amount of measurement noise.

It is to be noted that the mode changes that naturally occur in the line, also referenced by operation 342, can also be stored and used to minimize the number of required mode changes for identification.

As provided in operations 330 and 350, the information provided by telephone companies (TELCOs) can be helpful. For example, information about the existing service types and the new DSL services added to the lines can be useful in identification.

Note that because of the symmetry of the transfer matrix, the total number of NEXT transfer functions in the transfer matrix is equal to $(n-1)^2/2$. This symmetry also implies that the minimum number of tests for the identification of a line plant model consisting of n DSL service lines is equal to $(n-1)$.

The connectivity matrix of the line plant may have a block-diagonal structure after being subjected to a matrix reordering algorithm (operation 354), with each block representing a group of coupled lines (usually lines in the same binder). Therefore, once an initial model is obtained, the forced actuation process can be accelerated by applying mode changes simultaneously to multiple lines, each from a different block.

II. Event Detection

Event Detection may begin by time-stamping raw channel data at a transceiver or other detection site that is coupled to a channel, and then forwarding the time-stamped data to a channel processor. In an embodiment of the invention, the lowest layer of data processing is in the channel processor which monitors the time-stamped raw channel data for one of at least two event types. The first event type is an SNR change which occurs when there is a significant change in the noise level on the transceiver. The second event type is a mode change and occurs when the transceiver changes operating modes, e.g., from idle to showtime as in the DSL application. When either one of these events is detected, it is reported in an Event Log and the Event Log is passed on to the next, higher data processing layer. The module in which such event detection takes place is also called the channel processing block.

The inputs to the channel processing block may include, for example, one or more of the following:

Upstream and downstream signal to noise ratio (SNR) for each active frequency bin (such as for discrete multitone (DMT) type modulation systems) or one aggregate number (non-DMT)

Upstream and downstream signal attenuation (ATN) for each active bin or one aggregate number Upstream and downstream signal power (PWR) for each active bin or one aggregate number Upstream and downstream active bins (DMT only)

Upstream and downstream bit loading (DMT only)

The central frequency and transmit rate rates of the upstream and downstream transceivers before and after an event for carrier-less amplitude and phase (CAP) type modulation transceivers Transmit rate for transceivers, such as symmetric DSL (SDSL) type transceivers The operating mode of the modem (e.g., power-up, idle, activating, training, steady-state)

The outputs from the channel processing block that may be collected in a data structure called an Event Log are as follows:

The time at which the event occurs

The channel identification (ID)

The transceiver type

Modal states from the multiple model filtering (see the section entitled "Interactive Multiple Model" below)

The operating modes of the upstream and downstream transceivers before and after an event The SNR of the upstream and downstream transceivers before and after an event The bit rates of the upstream and downstream transceivers before and after an event The central frequency and transmit rates of the upstream and downstream transceivers before and after an event for CAP transceivers Transmit rate for SDSL transceivers The type of the event (SNR or Mode Change)

The processed line data in the form of noise, signal, and main channel transfer function (MCTF).

A. Event Detection Architecture

Figure 4A:
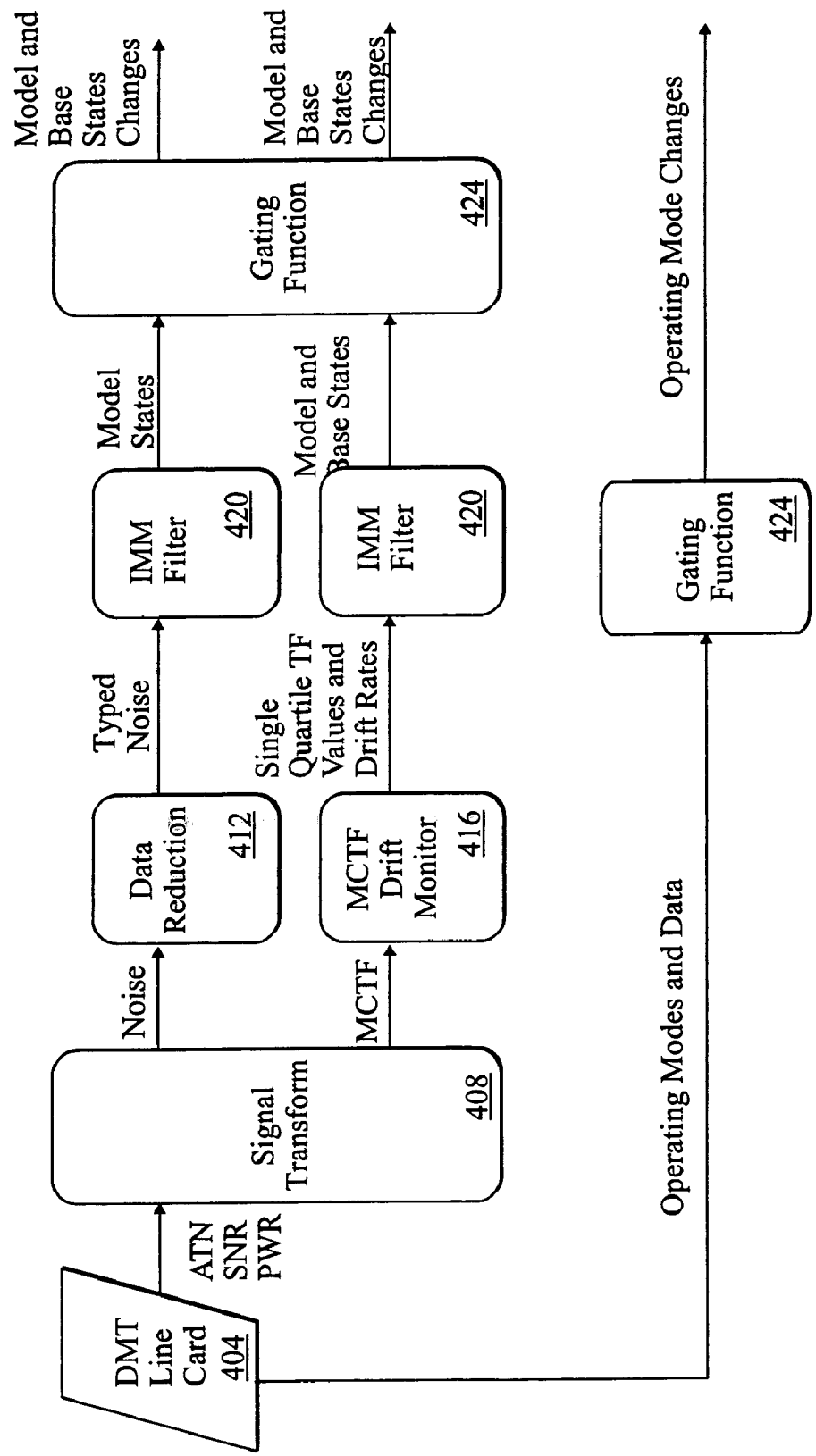
FIG. 4A illustrates a block diagram of an event detection architecture according to an embodiment of the invention.

An embodiment of a channel processing block suitable for DSL applications is depicted in FIG. 4A. The architecture may be roughly the same for both a DMT line card 404 and a Single Carrier (SC) line card (not shown), with the exception that the signal variables in DMT line cards are vectors rather than scalars. The blocks in FIG. 4A are described briefly here, and in more detail in the following sections.

1. Signal Transform Block 408

The signal transform block 408 coverts raw, digitized signals provided by a modem on a monitored line, into a more useful form. In one embodiment, a useful form for interference diagnosis is to have the time waveform as well as the spectrum of (1) transmit signal power for an offender and (2) noise for a victim. The signal transform block 408 applies the necessary transformation to the variables ATN, SNR, and PWR to produce:

Noise: The magnitude of the noise power in each bin

MCTF: An estimate of the main channel transfer function

Signal: An estimate of the transmitted power for each bin.

For an embodiment of the invention, additional useful variables are described in the section below entitled "Data Transformation."

2. Data Reduction Block 412

This block reduces the number of variables for non-aggregate data. For instance, in asymmetric DSL (ADSL) services, the data reduction block 412 takes 256 data bins and contracts them to just a few variables for non-aggregate data, so that only these few are actually monitored thereafter. An exemplary data reduction technique is described in the section entitled "Spectral Compression" below.

3. MCTF Drift Monitor Block 416

In some instances, the direct current (DC) levels of information carrying signals can drift to levels that affect performance of the detection and diagnosis system. The MCTF drift monitor block 416 estimates instantaneous level and drift rates for the main channel transfer functions for a number of bin groupings for non-aggregate data and for a single grouping for aggregate data. An example here would be to provide for four 64-bin groupings (quartiles) for non aggregate data. The drift estimates help give more accurate measures of the likelihood of a noise level change in the information carrying signal. See the section entitled "MCTF Drift Monitoring" below for further exemplary details.

4. IMM Filter Block 420

This block uses what is referred to here as an Interacting Multiple Model (IMM) methodology, to give a probability measure, based on statistical information, of the likelihood of a noise level change, categorized by disturber type. It does this by monitoring its input variables and deciding which of two possible models (steady or change) most accurately predict the actual signal. The probability assigned to either one of these models as being the correct model is known as the modal state, which constitutes an output of this block.

In addition to outputting a modal state, the IMM filter block 420 may also output a filtered base state of the input variables. A specific technique for determining such modal and base states is described in detail in the section below entitled "Modeling a Change in Disturber Configuration."

5. Gating Function Block 424

This block monitors its input variables and creates a record of the output variables if the input contains any significant information. Significant information in this case may mean any modal state that indicates a change from steady state, the operating mode before and after an event, or the steady state value of noise before and after and event. The outputs of the gating function block 424 are provided, along with the event being monitored, to the next higher processing layer, namely Event Clustering described below. This completes the description of the elements in FIG. 4A.

B. Data Transformation

To properly monitor the communication services, a good measure of the noise and parameterization of the main channel transfer function or gain in a channel is needed. In general, the data available from the transceivers are ATN, PWR and SNR. ATN represents the ratio of the transmitted power to the received power. PWR represents the power transmitted. SNR is the signal to noise ratio. More useful measures are SIGNAL, NOISE, and MCTF. SIGNAL represents the power of the signal received. NOISE represent the amount of noise additional to the received signal. MCTF (for main channel transfer function) is the ratio of the received signal to the transmitted signal. A transformation between the sets {ATN, PWR, SNR} and {SIGNAL, NOISE, MCTF} may be:

SIGNAL=$(SNR*PWR)/(ATN*(SNR+1))$

NOISE=$PWR/(ATN*(SNR+1))$

MCTF=$SNR/(ATN*(SNR+1))$

Note that the equations above hold when the variable are in linear and not logarithmic units.

C. Spectral Compression

The reduction of data is particularly desirable when diagnosing a network in which communication services are relatively broadband. For instance, in DMT-based DSL services, each modem has hundreds of signal channels that are divided into "bins". Each bin represents a small frequency range within the entire transmission bandwidth of a DMT modem. A method for efficiently monitoring the signals from a bin-based transceiver, such as the DMT modem, is described in greater detail below.

Figure 4B:
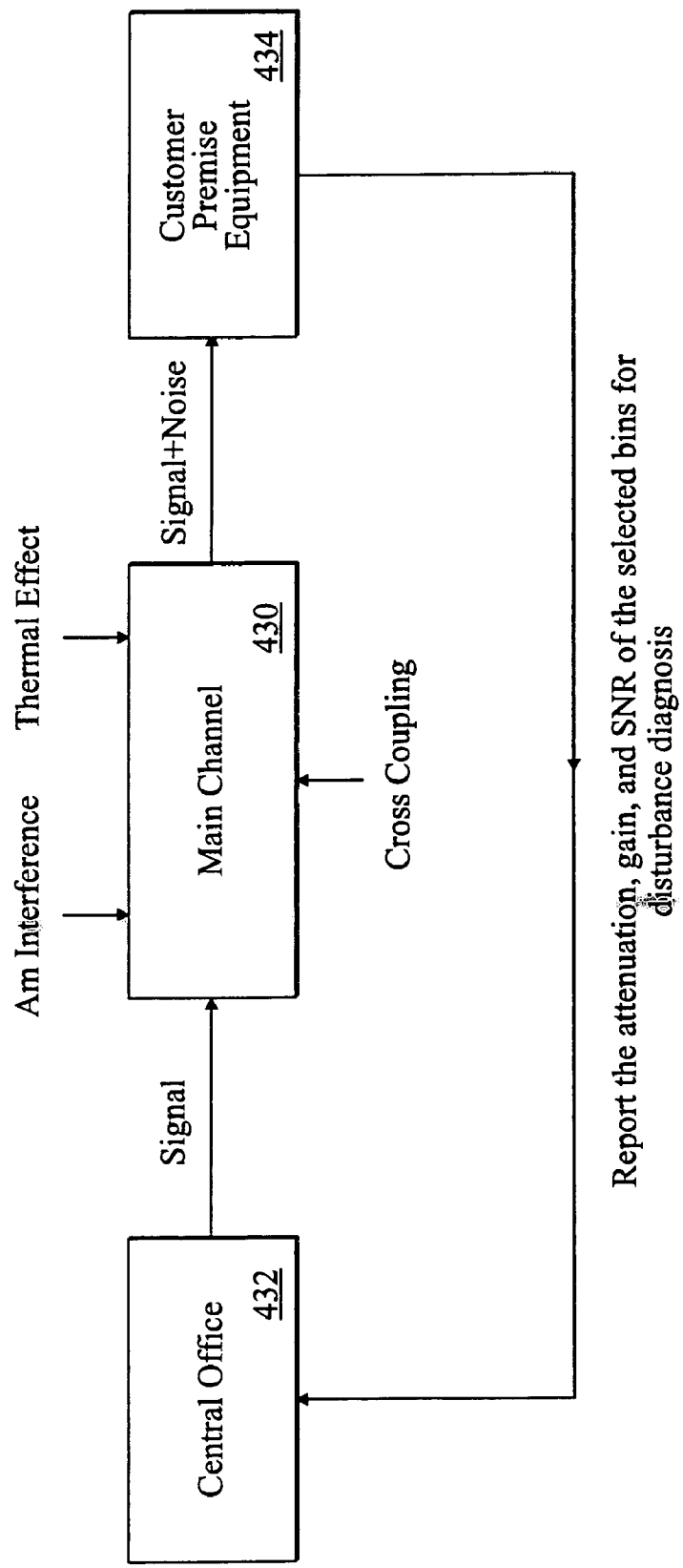
FIG. 4B illustrates a data transmission path in a multiple bin communication system.
Figure 4C:
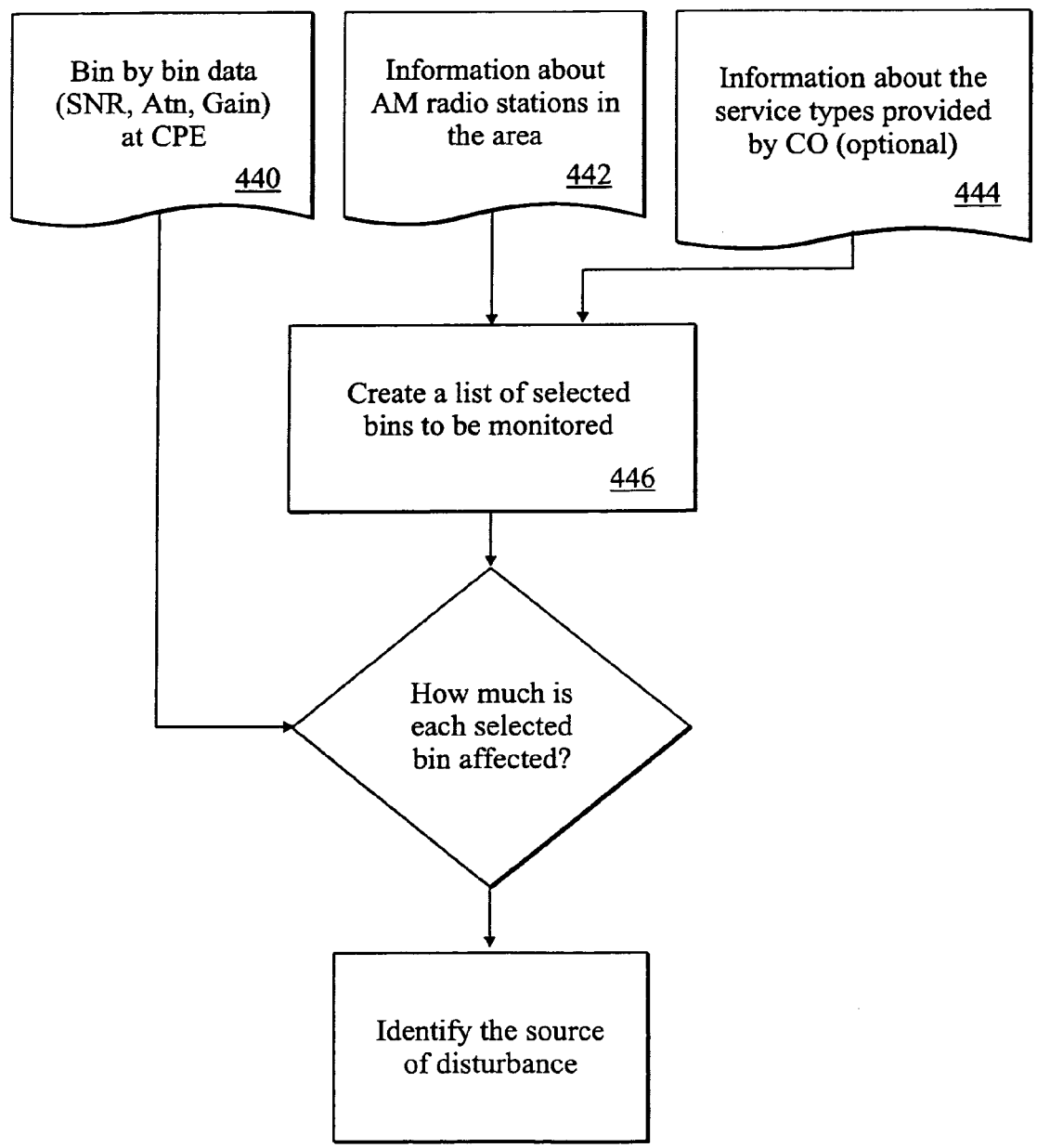
FIG. 4C shows a flow diagram of impairment diagnosis according to an embodiment of the invention.

Bin Selection for Reporting Spectral Information in DMT DSL Systems:

A block diagram of one example of a data transmission process and a flowchart of one embodiment of a method of the present invention are depicted in FIG. 4B and FIG. 4C, respectively. As can be seen from FIG. 4B, a main channel passes a signal received from a central office (CO) 432 to customer premises equipment (CPE) 434, with some added noise. A persistent and significant change in SNR of the victim, in this case the CPE 434, can be due to different interference sources such as thermal, AM radio station, and cross coupling between the victim and some of the other DSL services in the same binder (or the same cable). Referring now to the flow diagram of FIG. 4C, in DMT DSL systems, the bin by bin SNR is measured at customer premise equipment (CPE) as provided by operation 440 and reported back to the central office. By investigating the power spectral density (PSD) of different service types (operation 444) and by collecting the information about all effective AM radio stations in the area (operation 442), the focus may be on certain frequency bins rather than all frequency bins for each victim (operation 446). To clarify the point, consider the following examples:

Basic Access DSL Disturbers: The power spectral density of n basic access DSL NEXT disturbers can be given by:

$$PSD_{DSL\text{-}Disturber} = K_{DSL} \times \frac{2}{f_0} \times \frac{\left(\sin\left(\frac{\pi f}{f_0}\right)\right)^2}{\left(\frac{\pi f}{f_0}\right)^2} \times \frac{1}{1+\left(\frac{f}{f_{3\,dB}}\right)^4} \times (x_n \times f^{3/2})$$

where $f_0$=80 KHz, $f_{3\,dB}$=80 KHz, $$K_{DSL} = \frac{5}{9} \times \frac{V_P^2}{R},$$

$V_p$=2.5 Volts, R=135 Ohms, and $x_n$=8.818×10$^{-14}$×(n/49)$^{0.6}$. After plotting this function, it can be seen that the local maximum occurs at the following frequencies:

$f_{m1}$=34 KHz, $f_{m2}$=110 KHz, $f_{m3}$=193 KHz, . . .

This implies that change of SNR due to DSL NEXT disturbers is more significant in certain frequency ranges. The most significant change occurs at $f_{m1}$=34 KHz which corresponds to the 9$^{th}$ bin. Therefore, the change of SNR at certain bins in the main lobe (or a few more bins in the side lobes) may be checked to verify whether the corresponding change is due to a DSL NEXT disturber or not. Moreover, for a DSL NEXT disturber, change of SNR will be negligible at certain frequencies given by:

$f_{z1}=f_0$=80 KHz, $f_{z2}=2f_0$=160 KHz, $f_{z3}=3f_0$=240 KHz, . . .

This may also be used to distinguish a DSL NEXT disturber from the other types of disturbers.

HDSL Disturbers: The power spectral density of n HDSL NEXT disturbers can be given by:

$$PSD_{HDSL\text{-}Disturber} = K_{HDSL} \times \frac{2}{f_0} \times \frac{\left(\sin\left(\frac{\pi f}{f_0}\right)\right)^2}{\left(\frac{\pi f}{f_0}\right)^2} \times \frac{1}{1+\left(\frac{f}{f_{3\,dB}}\right)^8} \times (x_n \times f^{3/2})$$

where $f_0$=392 KHz, $f_{3dB}$=196 KHz, $$K_{DSL} = \frac{5}{9} \times \frac{V_P^2}{R},$$

$V_P$=2.70 Volts, R=135 Ohms, and $x_n$=8.818×10$^{-14}$× $(n/49)^{0.6}$. After plotting this function, it can be seen from this figure that the local maximum occurs at the following frequencies:

$f_{m1}$=142 KHz, $f_{m2}$=484 KHz, . . .

In addition, for a HDSL NEXT disturber, change of SNR will be negligible at certain frequencies given by:

$f_{z1}$=$f_0$=392 KHz, $f_{z2}$=$2f_0$=784 KHz, . . .

Like the previous case, these sets of frequencies may be used to identify HDSL disturbers by monitoring SNR at the corresponding bins.

T1 Line Disturbers: The power spectral density of n T1 line NEXT disturbers are given by:

$$PSD_{T1Disturber} = \frac{V_P^2}{R_L} \times \frac{2}{f_0} \times \frac{\left(\sin\left(\frac{\pi f}{f_0}\right)\right)^2}{\left(\frac{\pi f}{f_0}\right)^2} \times$$

$$\sin^2\left(\frac{\pi f}{f_0}\right) \times \frac{1}{1+\left(\frac{f}{f_{3\,dB-LPF}}\right)^6} \times \frac{f^2}{f^2 + f^2_{3\,dB-HPF}} \times (x_n \times f^{3/2})$$

where $f_0$=1.544 MHz, $f_{3\,dB-LPF}$=3 MHz, $f_{3\,dB-HPF}$=40 KHz, $V_P$=3.6 Volts, $R_L$=100 Ohms, and $x_n$=8.818×10$^{-14}$× $(n/49)^{0.6}$. After plotting this function, it can be seen from this figure that the local maximum occurs at the following frequencies:

$f_{m1}$=893 KHz, . . .

In addition, for a T1 line disturber, change of SNR may be negligible at certain frequencies given by:

$f_{z1}$=$f_0$=1.544 MHz, $f_{z2}$=$2f_0$, . . .

This implies that a significant change of SNR at $f_{m1}$ (and the neighbor bins) and no change of SNR at $f_{z1}$, defined above, can only be caused by T1 line disturbers.

ADSL Disturbers: The power spectral density of upstream ADSL NEXT disturber into the downstream is given by:

$$PSD_{ADSL-Disturber} = K_{ADSL} \times \frac{2}{f_0} \times \frac{\left(\sin\left(\frac{\pi f}{f_0}\right)\right)^2}{\left(\frac{\pi f}{f_0}\right)^2} \times$$

$$\frac{1}{1+\left(\frac{f}{f_{h-LPF}}\right)^{20.32}} \times \frac{f^{7.34} + f^{7.34}_{l-HPF}}{f^{7.34} + f^{7.34}_{h-HPF}} \times (x_n \times f^{3/2})$$

where $f_0$=276 KHz, $f_{h-LPF}$=138 KHz, $f_{1-HPF}$=4 KHz, $f_{h-HPF}$=25.875 KHz, $K_{ADSL}$=0.0437 Watts, and $x_n$=8.818×10$^{-14}$×$(n/49)^{0.6}$. After plotting this function, it can be seen that the local maximum occurs at the following frequencies:

$f_{m1}$=112 KHz, . . .

In addition, for an upstream ADSL NEXT disturber into the downstream, change of SNR will be negligible at certain frequencies given by:

$f_{z1}$=$f_0$=276 KHz, $f_{z2}$=$2f_0$, . . .

This implies that a significant change of SNR at $f_{m1}$, and no change of SNR at $f_{z1}$ defined above, can only be caused by an upstream ADSL NEXT disturber into the downstream.

As a result, the source of the cross-talk can be identified by checking the SNR at 2n frequency bins, where n denotes the number of different service types as the potential disturbers. Note that different service types have distinct PSD characteristics in terms of peaks and zeros.

It should be noted that the term $x_n \times f^{3/2}$ in different disturber equations represents the cross-talk transfer function. In case the real transfer function for the cross-talk is different from this expression, the PSD of the output will be zero at $f_{z1}$, $f_{z2}$, . . . . The real transfer function will not be identically zero over a frequency range. Therefore, the neighbor bins of $f_{m1}$, $f_{m2}$, . . . may be used to identify the significant change in SNR. In addition, once the NEXT transfer function is identified, the set of frequency bins for each service-type may be chosen accordingly.

It should also be noted that case certain frequency bins are not available for monitoring (e.g. the frequency bins below 32 and above 256), one can always search for the most effective frequency bins in the available side-lobes to be monitored.

Additionally, it should be noted that the frequencies corresponding to the zeros of the PSD ($f_{z1}$, $f_{z2}$, . . . ) may not be essential, but may be useful in identifying the service type associated with the disturber. In other words, one can identify the disturber by only monitoring the bins corresponding to the maximum values of the PSD ($f_{m1}$, $f_{m2}$, . . . ). The frequency of zeros just increase the level of confidence in diagnosis.

Still further, it should be noted that a similar approach to identify external disturbers may also be used. For example, if m effective AM radio stations exist in the area, the frequency bin corresponding to the central modulating frequency of each radio station may be checked to see if the change of SNR is mainly focused in those frequency bins (e.g. bin no. 157 for AM680 and bin no. 187 for AM810). On the other hand, if SNR changes at all monitored frequencies, it may be concluded that the change of SNR is caused by the change of temperature.

Still further, it should be noted that a similar approach to identify external disturbers may also be used. For example, if m effective AM radio stations exist in the area, the frequency bin corresponding to the central modulating frequency of each radio station may be checked to see if the change of SNR is mainly focused in those frequency bins (e.g. bin no. 157 for AM680 and bin no. 187 for AM810). On the other hand, if SNR changes at all monitored frequencies, it may be concluded that the change of SNR is caused by the change of temperature.

Example: Plot the magnitude of 4 NEXT transfer functions between a DMT DSL wire, and four other lines in a 2000 feet binder consisting of 25 wires. Assume that these 4 lines are assigned for a basic DSL, HDSL, T1, and ADSL respectively, and that only the frequency bins between 32 and 231 can be monitored. Assume also, that the effective AM radio stations in the area (in terms of the effect on the DSL lines) are AM680 and AM810. Also, plot the cross coupling effect of each line on the DMT line. By comparing these figures (not shown) and taking the effective AM radio carriers into account, the most distinguishable frequency bins to be monitored may be selected. The following would be a good selection:

Basic DSL Disturber: $f_m$=516 KHz (bin no. 119) and $f_z$=480 KHz (bin no. 111).
HDSL Disturber: $f_m$=270 KHz (bin no. 62) and $f_z$=392 KHz (bin no. 90).
T1 Disturber: $f_m$=601 KHz (bin no. 139).
ADSL Disturber: $f_m$=138 KHz (bin no. 32) and $f_z$=251 KHz (bin no. 58).
AM Interference: $f_1$=680 KHz (bin no. 157) and $f_{2=810}$ KHz (bin no. 187).

Note that in the given frequency range the T1 disturber has no zeros. Thus, only one bin has been assigned to it.

It is to be noted that the total number of the selected bins is less than or equal to:
   n=2×(number of disturber lines)+number of effective AM radio stations.

In the given example, only 9 of the 200 available bins are to be monitored. This results in a significant improvement in the data transmission process.

Compression of DMT Spectral Information:

This method selects the number of signals to be monitored by means of a Weighted Least Squares (WLS) algorithm. Suppose that the DMT modem has 256 frequency bins. In addition, suppose that there are n<<256 disturber signal types, each of which has its own characteristic frequency spectrum. Then it is possible to define vectors $a_1, \ldots, a_n$ whose entries are a discrete approximation of the frequency spectrum each of the disturber signal types which may be coupled into the individual frequency bin. Now let the vector b represent the measured noise from each of the bins. It is possible to solve the linear system Ax=b in the least squares sense, where A=$[a_1, \ldots, a_n]$. It then suffices to monitor the entries of x, which will number significantly less than 256. Furthermore, if the columns of A are suitable normalized, then the value of x will represent the number of equivalent normalized services whose signal couples as noise into the monitored service.

This method may be improved to incorporate the uncertainty in the shape of Near End Crosstalk (NEXT) transfer functions. The representative transfer function is denoted by G(f) and its variance by $P_G$(f), where f denotes discretized frequency or bin number. The characteristic spectra of the transmitted service types are $s_1, \ldots, s_n$. Then $a_1, \ldots, a_n$ may be written as $Gs_1, \ldots, Gs_n$.

The uncertainty in the shape of NEXT may be taken into account by solving the weighted least squares problem WAx=Wb, where W=$[\text{diag}(P_G)]^{-1}$ and where A=$[Gs_1, \ldots, Gs_n]$. In such a case the value of x is a more accurate representation of the number of equivalent normalized services whose signal couples as noise into the monitored service. Generally, a system model may include a nominal dynamics and uncertainty Δ, which are either additive or multiplicative. The actual channel may be bounded by the uncertainty which is normalized so that $\|\Delta\|<=1$.

Additionally, it may be possible to monitor the residual of the weighted least squares problem to identify other unmodeled disturbers, and in particular AM disturbers. This may be accomplished by computing the residual r=$(I-A(WA)^\#W)b$, where $^\#$ denotes the pseudo-inverse, and noting those bins whose magnitudes are much larger relative to the others.

Rolling Bins for AM Detection:

The AM band covers 540 kHz to 1.6 MHz. By FCC regulations, the AM stations are at least 10 kHz apart. Most DSL transceivers nowadays are operating at a maximum frequency limit of 1.1 MHz, however, newer methods for DSL systems are emerging which go much higher in their frequency range.

In order to detect if there is AM interference on a DSL line, one way is to scan the frequency range of the transceiver and see if there is clear evidence of an AM radio station. One sign of an AM station is that it covers about 10 kHz bandwidth. Therefore, if a strong reduction in the signal to noise ratio across a band of about 10 kHz is observed, the presence of AM interference is likely. Such monitoring is performed by so-called DMT transceivers, mostly utilized by ADSL (Asynchronous DSL) services.

A typical DMT transceiver has 256 channels of 4-kHz bandwidth each. Each of these channels can be monitored for their SNR (Signal to Noise Ratio) values. These values are neither constant nor uniform, but they follow a relatively smooth pattern with peaks and valleys. However, when the AM is interfering, across three adjacent bands of 4 kHz each, there is a marked deterioration of SNR.

Figure 4D:
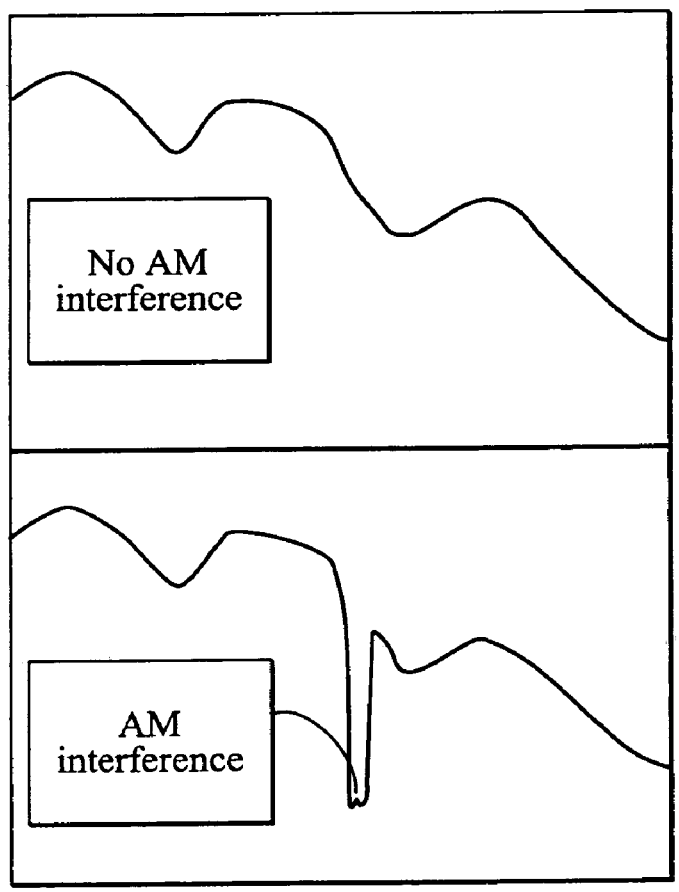
FIG. 4D depicts an exemplary SNR spectrum with and without AM interference.

FIG. 4D depicts a representative SNR spectrum with and without AM interference, respectively. To detect the presence of a 10 kHz wide AM signature, a large number of frequency bins must be scanned, typically the range covering 540–1,100 kHz, corresponding to about 140 frequency bins, each 4 kHz wide. Collecting and processing so many channels on a loop plant, where there may be thousands of such transceivers can easily overwhelm computational resources available on the Line Cards, which collect such basic information from transceivers. One way to overcome this difficulty is exploiting the fact that AM radio interference is typically constant over long periods of time, changing under circumstances such as power reduction in the evenings, or the radio station going off the air in after hours and coming back in the early morning. Thus, the shortcoming of computational resources can be traded off with time. Instead of monitoring all of the 140 bins for SNR at each data sample time, fewer bins may be monitored, e.g., three at a time, moving the bins up by 3 locations each time. Once the upper bin is reached, then the process starts all over again from the first bin. This way, all 140 bins can be scanned in about 47 samples, i.e., if 3 bins were chosen. These 47 samples could be completed in about one minute, which is a very acceptable time window for detecting AM interference. Other choices for bin numbers are of course possible, with corresponding reduction in compute resources and increase in scan-time.

D. Modeling a Change in Disturber Configuration

To determine the probability of a disturber being a cause of interference in a victim channel, an effect of a change in the disturber configuration on the victim channel is determined. An example of a technique for determining this effect is described below.

Figure 5A:
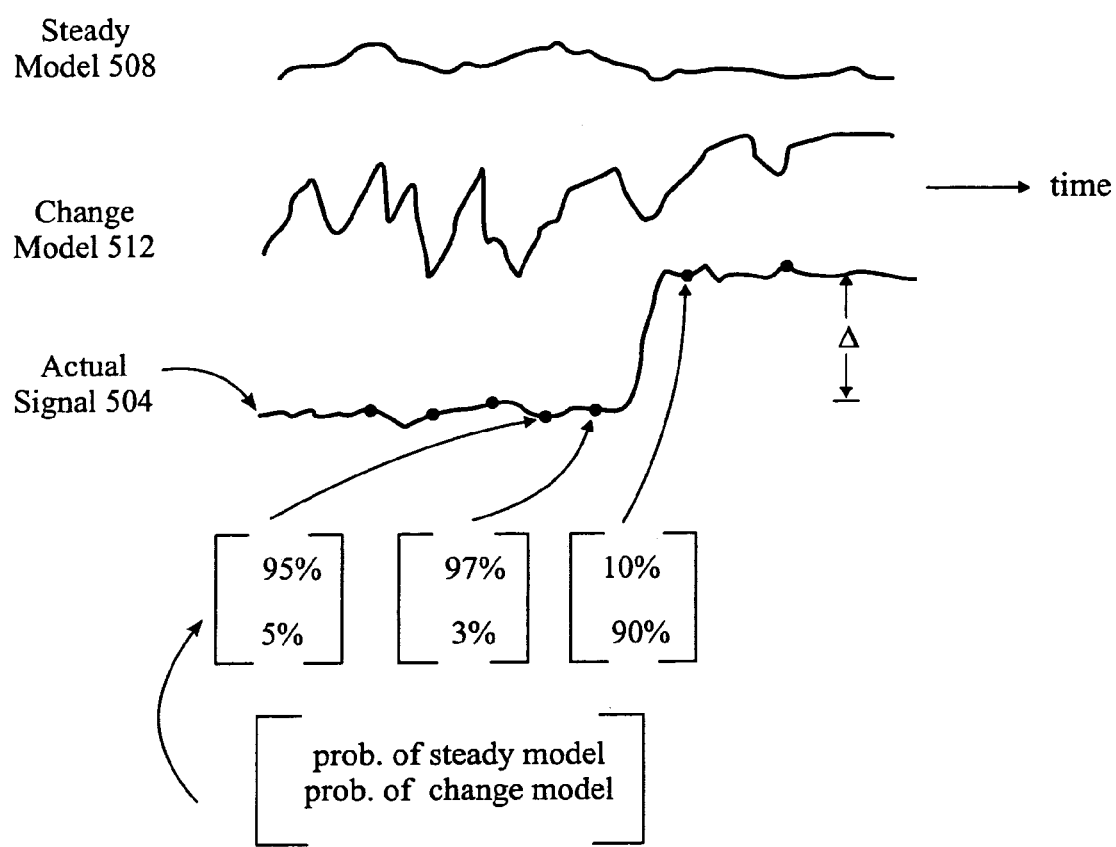
FIG. 5A shows an example of probabilistic modeling used for detecting events.

Referring now to FIG. 5A, it is desirable to detect changes in noise in the output of a transceiver by monitoring samples of an actual signal 504. The IMM methodology in the IMM filter block 420 introduced above is a computationally efficient means by which (1) the modality of a jump-linear system is determined, that is which statistical model, steady model 508 or change model 512, best predicts the actual signal at one or more given samples, and (2) a prediction is made as to whether there has been a change in the signal being monitored, at a given one or more samples of the actual signal 504. The models may be based upon different forms of a random walk process, combined with statistical information concerning actual signal behavior during steady and change situations and a Markov chain process, as described below. A probability vector (modal state probability) is generated for each sample point as shown, indicating the relative probability of each model accurately describing the actual signal 504.

The IMM methodology reports the difference in victim noise before and after the sample at which the change occurred, as well as the base state of the sample sequence being monitored. This methodology is appropriate for identifying, for instance, the sudden changes in noise on a victim channel that are due to an added communication service or a change in an offender's service mode.

Advantageously, this methodology is able to use a priori statistical information as well as data measurements to estimate the probability of a change in noise due to disturber reconfiguration. In addition to its use for determining whether a change should be deemed an event, or whether it should be ignored, the modal state probability is advantageously used directly in hypothesis testing as described below to diagnose the nature of the cause of an impairment. Also, the accuracy of the modal state probability may be verified in the hypothesis testing.

The detailed IMM methodology, in one embodiment, proceeds as follows. A disturber in this embodiment is deemed to be a DSL service whose coupled signal appears as a significantly high level of noise on a monitored DSL line. Some hypothesis tests require as an input a probabilistic measure of the likelihood that there has been a significant change in the disturber power, either measured directly or via a measured signal to noise ratio (SNR) from a DSL modem. There are a number of difficulties that arise in formulating the inputs to a hypothesis testing methodology: The measured SNR or disturber power signals may be noisy, and therefore require some filtering to determine whether or not there was an actual significant change in SNR or disturber power, but not so much filtering as to obscure the signal change. In addition, the likelihood of a change in disturber configuration is small, and should be taken into account in a probabilistic method.

The difficulty of optimally filtering a noise power or SNR signal while providing a probabilistic measure of the likelihood which takes into account a priori statistical information about the likelihood of change may be handled by an Interacting Multiple Model (IMM) filter. In one embodiment, the IMM filter uses the disturber signal or SNR signal as an input and produces as an output a filtered version of the input (called the base state) as well as the probabilities that the signal was typical of a steady-state mode or a non-steady-state mode (called the modal state). The modal states, being probabilistic measures, can then be used directly in the hypothesis testing.

The IMM filter is useful because it can incorporate two models to the generation of the noise power or SNR signal: one which models the generation of a steady-state noise power or SNR signal and one which models the generation of a noise power or SNR signal in which there is an abrupt change in value. The two models can describe not only the frequency domain characteristics of the signal generation, but also the probability that the signal will change over a given time interval via a Markov Chain Model.

Figure 5B:
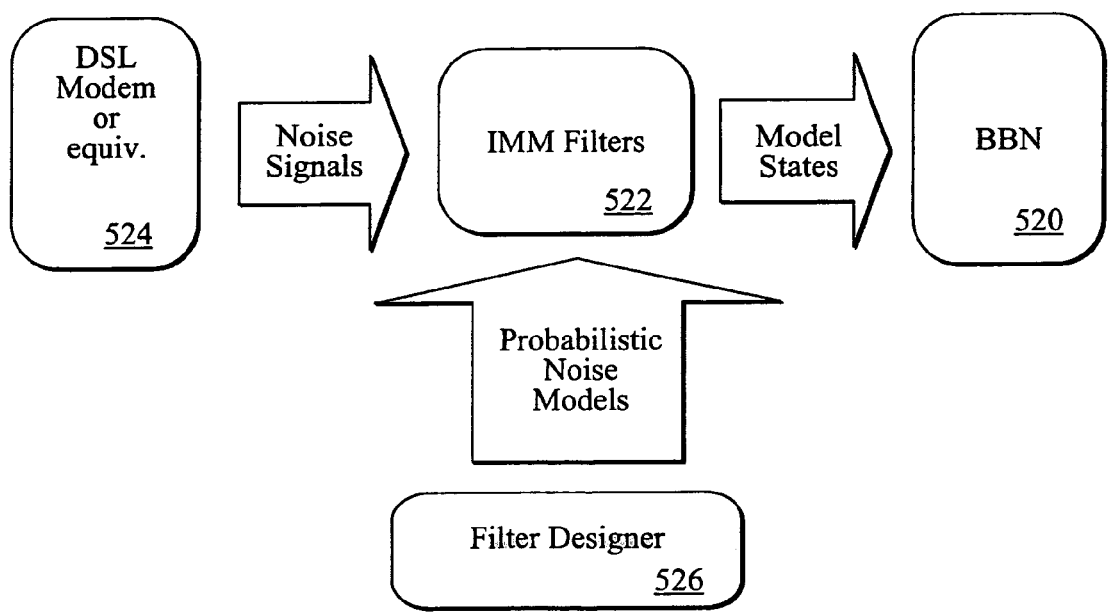
FIG. 5B illustrates a functional diagram of the IMM based input generator for a hypothesis testing methodology, according to an embodiment of the invention.

Referring now to FIG. 5B, a functional diagram of the IMM based input generator for a hypothesis testing methodology, such as a Bayesian Belief Network (BBN) 520, is given. The generic nature of the IMM model structure is such that it allows a designer 526 of an IMM filter 522 to quite accurately model any expected type of disturber noise or SNR output from a DSL modem 524.

One embodiment of the present invention includes a method of using the Interacting Multiple Model (IMM) filter. This filter produces probabilistic measures (called modal states) of the likelihood that the noise profiles from measured noise signals from DSL modems arise from steady-state or non-steady-state operation. These modal states are then used within Bayesian Belief Networks (BBNs) for the purpose of hypothesis testing. The method of using the standard IMM filter, however, may be improved since the standard algorithm operates as a state predictor, that is, using only past data. It does not take advantage of data records in which past and future data are available.

For example, if more accuracy is needed in the prediction of the modal states that define whether or not a noise profile was generated from a steady-state process, one embodiment of the present invention may take advantage of storing the data and retrodicting (smoothing) the states using past and future data. The main elements of this approach include one or more of the following:

- defining the Markov chain for the modal state transitions for both forward and backward time,
- forward-backward filtering the data,
- composing the retrodicted covariance from the forward and backward covariances using the "parallel resistors law",
- composing the retrodicted base state from the forward and backward base states weighted by their information content (defined as the inverse of their covariances), and
- defining the retrodicted modal states based on the likelihood functions associated with the difference in the retrodicted states at adjacent time steps.

The Interacting Multiple Model (IMM) algorithm is a computationally efficient means by which the modalities of jump-linear systems, as well as their outputs may be accurately identified. This algorithm is appropriate for identifying the sudden changes in SNR that is common when the level of noise from disturbers suddenly change due to an added service or a change in service mode. This algorithm also is superior in the sense that it is able to use a priori statistical information as well as data measurements to estimate the probability of a change in SNR due to disturber reconfiguration. These probabilities may then be used directly in a Bayesian Belief Network or other Hypothesis Testing algorithms to perform detection and diagnosis functions.

Improvements to the standard IMM (prediction) algorithm are described below such that the estimation algorithm may run in a retrodiction mode. These improvements use a forward-backward type of smoothing algorithm to increase the fidelity of the SNR estimation and to reduce spurious mode change detection errors.

Interacting Multiple Model Algorithm Basics

The Interacting Multiple Model (IMM) is designed to identify a system modeled by the equations $$x(k)=F[M(k)]x(k-1)+v[M(k)](k-1) \quad (1)$$

$$z(k)=H[M(k)]x(k)+w[M(k)](k), \quad (2)$$

where $M(k)$ denotes the mode at time k, i.e., the model in effect at the end of the sampling period k. The mode $M(k)$ can be one of several possible modes, but for the purpose of SNR change detection, we shall consider only two modal states, $M_1$ and $M_2$. The vector $x(k)$ will be referred to as the base state. The process and measurement noises, $v(k)$ and w(k) are modeled as zero mean normally distributed white noise processes with variances $$E[v[M_j]v^T[M_j]] = Q_j \quad (3)$$

$$E[w[M_j]w^T[M_j]] = R_j \quad (4)$$

The a priori modal jump process is a Markov process with transition probabilities $$p_{ij} = = P\{M(k) = M_j | M(k-1) = M_i\} \quad (5).$$

The algorithm for SNR change monitoring is designed by ascribing two stochastic models to describe SNR changes, in the form of (1). Fundamentally, the measurement z in (2) will be the "measurement" of the reciprocal of the square root of the signal to noise ratio, i.e., $$z = 1/\sqrt{SNR} \quad (6).$$

This form of the measurement may be used for two reasons. The first is that the signal is expected to remain more or less constant, and the second is that the SNR is reported as a power. As a result the measurement equation written as (6) is inherently more linearizable. The state x at present is modeled as a scalar equation with the assumption that the measurement of x is not subject to any dynamics. This assumption is valid if the SNR measurements are the average of the SNR measurements over the sample period. If the measurements are smoothed by first order filter as in the case of an LMS update, then the state equation (1) would have to have greater dimensionality to reflect this.

Figure 5C:
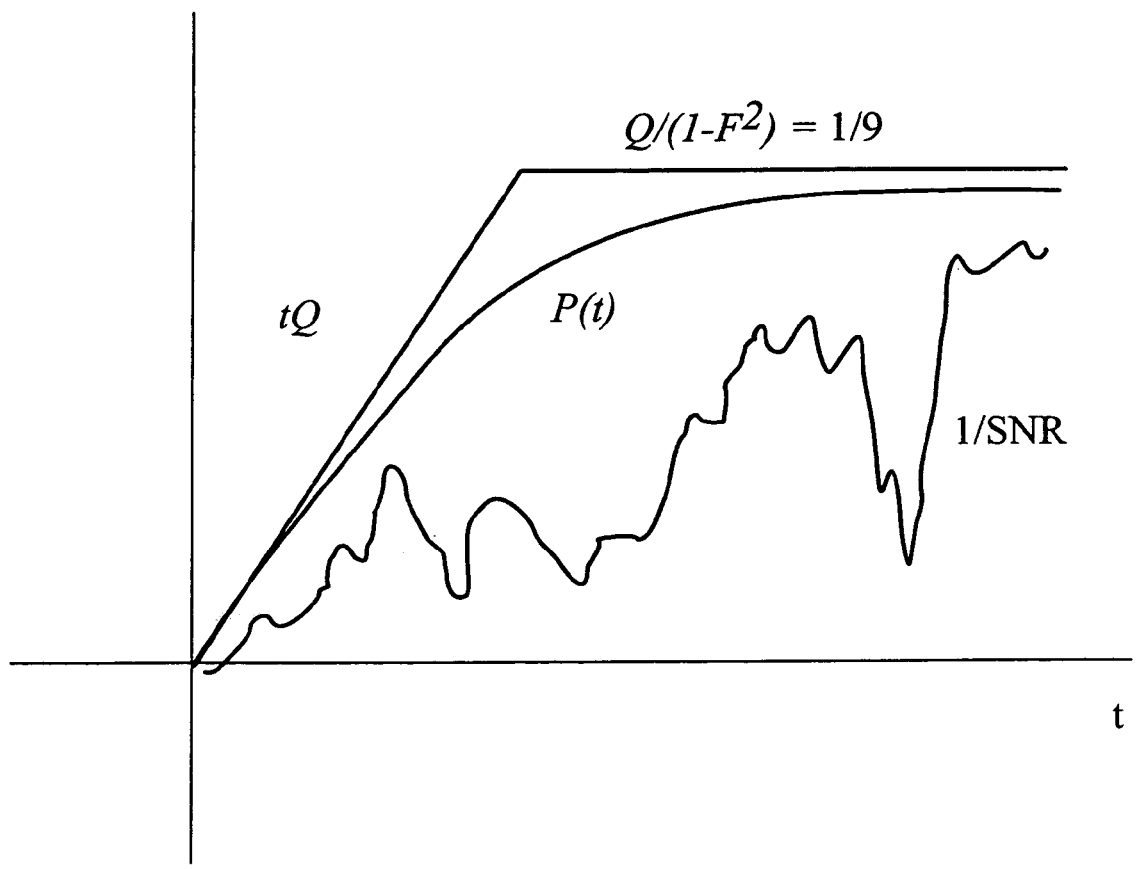
FIG. 5C depicts the evolution of the variance of the state of the IMM output.

The state equation for each of the modes is approximately that of a random-walk process. Thus the variance of x grows linearly with time, i.e., $P_k = kQ$, where Q is the variance of the process noise. These equations are slightly modified to take into account that z may not be greater than one. This is accomplished by noting that the steady state variance $P_\infty$ may be written as $Q/(1-F^2)$, and choosing F such that $P_\infty = 1$ is a 3σ event. Since Q is determined by desired growth rate in the variance for a random walk process, then the value of F is given by $F = \sqrt{1-9Q}$. Thus the evolution of the variance of the state is depicted in FIG. 5C.

The SNR modeling is complete once the measurement noise and process noise are characterized for the steady-state mode and the change mode, the primary difference between the two modes being the magnitude of associated process noise covariances Q.

Figure 5D:
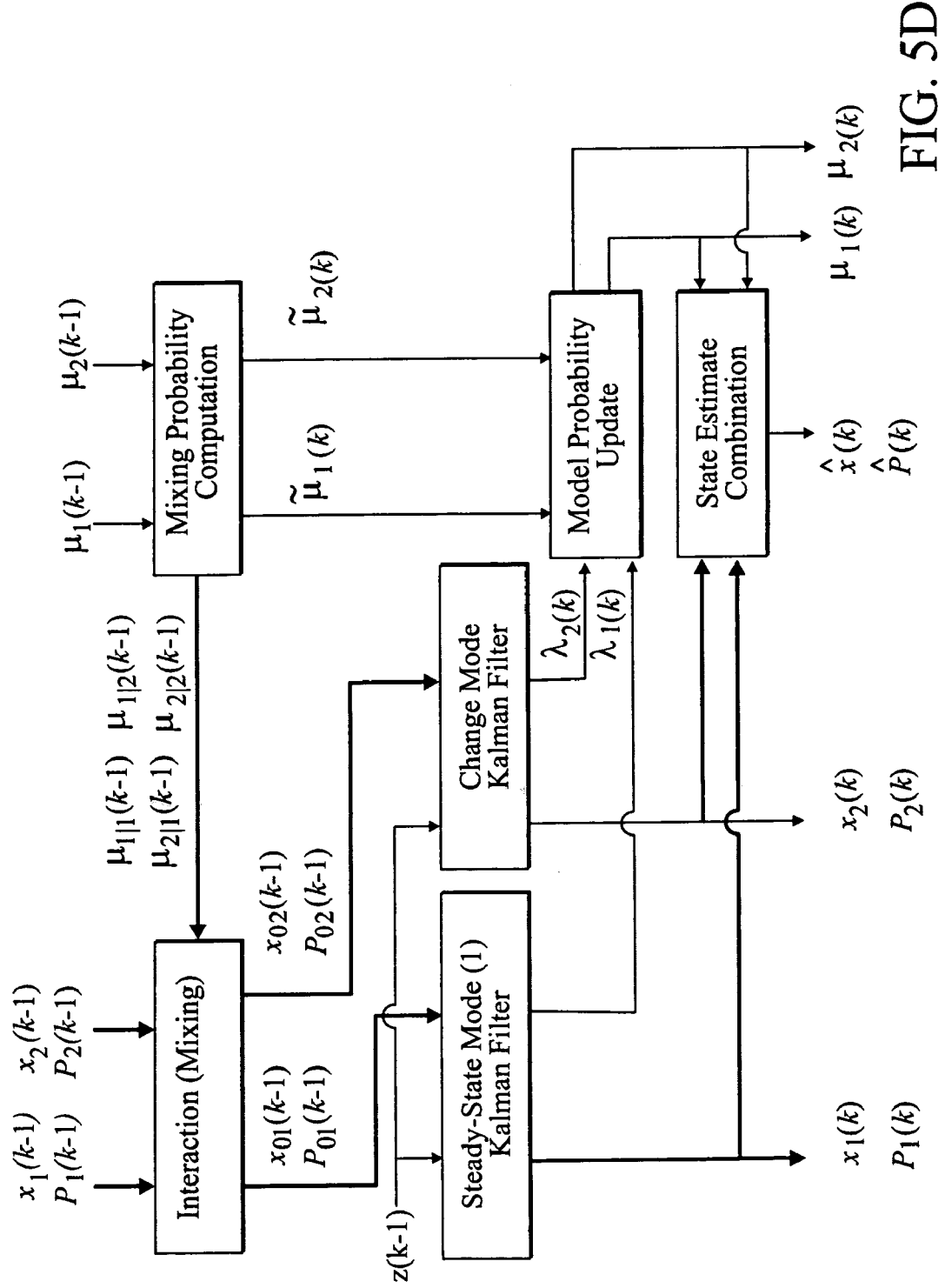
FIG. 5D shows a flow diagram of an embodiment of the IMM algorithm.

The IMM prediction algorithm is used to estimate not only the base state x from (1), but also to predict the modal state (change/steady-state). A diagram of the IMM algorithm is depicted in FIG. 5D.

Mixing Probability Computation

The modal mixing probabilities $\mu_{1|1}, \mu_{1|2}, \mu_{2|1}, \mu_{2|2}$ are computed from $\mu_1(k-1)$ and $\mu_2(k-1)$ as follows:

$$\tilde{\mu}_1(k) = p_{11}\mu_1(k-1) + p_{21}\mu_2(k-1)$$

$$\tilde{\mu}_2(k) = p_{12}\mu_1(k-1) + p_{22}\mu_2(k-1)$$

$$\mu_{1|1} = p_{11}\mu_1(k-1)/\tilde{\mu}_1(k)$$

$$\mu_{1|2} = p_{11}\mu_1(k-1)/\tilde{\mu}_2(k)$$

$$\mu_{2|1} = p_{21}\mu_2(k-1)/\tilde{\mu}_1(k)$$

$$\mu_{2|2} = p_{22}\mu_2(k-1)/\tilde{\mu}_2(k)$$

Interaction (Mixing)

The mixed initial state estimates $x_{01}(k-1)$ and $x_{02}(k-1)$ and covariances $P_{01}(k-1)$ and $P_{02}(k-1)$ are computed from the previous base state estimates $x_1(k-1)$ and $x_2(k-1)$ as follows:

$$x_{01}(k-1) = \mu_{1|1}x_1(k-1) + \mu_{2|1}x_2(k-1)$$

$$x_{02}(k-1) = \mu_{1|2}x_1(k-1) + \mu_{2|2}x_2(k-1)$$

$$P_{01}(k-1) = \mu_{1|1}(P_1(k-1) + (x_1(k-1) - x_{01}(k-1))^2) + \mu_{2|1}(P_2(k-1) + (x_2(k-1) - x_{01}(k-1))^2)$$

$$P_{02}(k-1) = \mu_{1|2}(P_1(k-1) + (x_1(k-1) - x_{02}(k-1))^2) + \mu_{2|2}(P_2(k-1) + (x_2(k-1) - x_{02}(k-1))^2)$$

Note that the base states are linear combinations of the filter states, and that the covariances add similarly, but also include a "spread of the means" term.

Modal Kalman Filtering

The state estimate, covariance, and likelihood function updates for each modal Kalman filter from the mixed initial states and the measurements are computed as follows (i=1, 2):

$$\tilde{x}_i(k) = F_i x_{0i}(k-1)$$

$$\tilde{z}_i(k) = \tilde{x}_i(k-1)$$

$$v_i(k) = z(k) - \tilde{z}_i(k)$$

$$\tilde{P}_i(k) = F_i P_{0i} F_i + Q_i$$

$$S_i(k) = \tilde{P}_i(k) + R_i$$

$$W_i(k) = \tilde{P}_i(k)/S_i(k)$$

$$x_i(k) = \tilde{x}_i(k) + W_i(k)v_i(k)$$

$$P_i(k) = \tilde{P}_i(k) - W_i(k)S_i(k)W_i(k)$$

$$\lambda_i(k) = \frac{1}{\sqrt{2\pi S_i(k)}} \exp(-(v_i(k))^2 / 2S_i(k))$$

Mode Probability Update

The modal states $\mu_1(k)$ and $\mu_2(k)$ are updated from the likelihood functions $\lambda_1(k)$ and $\lambda_2(k)$ as follows:

$$c = \tilde{\mu}_1(k)\lambda_1(k) + \tilde{\mu}_2(k)\lambda_2(k)$$

$$\mu_1(k) = \frac{\tilde{\mu}_1(k)}{c}\lambda_1(k)$$

$$\mu_2(k) = \frac{\tilde{\mu}_2(k)}{c}\lambda_2(k)$$

State Estimate Combination

A refined estimate for the state and the covariance may be computed using the various modal and base states and covariances may be computed as follows:

$$\hat{x}(k) = \mu_1(k)x_1(k) + \mu_2(k)x_2(k)$$

$$\hat{P}(k) = \mu_1(k)(P_1(k) + (\hat{x}(k) - x_1(k))^2) + \mu_2(k)(P_2(k) + (\hat{x}(k) - x_2(k))^2)$$

Interacting Multiple Model Retrodiction

If more accuracy is needed in the prediction of the modal states that define a large change in the SNR, one embodiment of the present invention may take advantage of storing the data and retrodicting (smoothing) the states using past and future data. The main elements of this approach involve

- defining the Markov chain for the modal state transitions for both forward and backward time,
- forward-backward filtering the data,
- composing the retrodicted covariance from the forward and backward covariances using the "parallel resistors law",
- composing the retrodicted base state from the forward and backward base states weighted by their information content (defined as the inverse of their covariances),
- defining the retrodicted modal states based on the likelihood functions associated with the difference in the retrodicted states at adjacent time steps.

Backward Time Markov Chain Definition

To be able to filter the data backwards in time, it first becomes necessary to obtain the equivalent for $p_{ij}$ for reversed time. First, define $q_{ij}$ as $$q_{ij}=P\{M(k)=M_i|M(k-1)=M_j\} \quad (7)$$

An application of Bayes' rule gives $$q_{ij}=p_{ji}n_j/n_i \quad (8)$$

where $n_j$ and $n_i$ are the steady state probabilities for $M_j$ and $M_i$ respectively. Define $$\Pi \equiv \begin{bmatrix} p_{11} & p_{12} \\ p_{21} & p_{22} \end{bmatrix}. \quad (9)$$

The steady state probabilities $n_1$ and $n_2$ may be computed as $$\begin{bmatrix} n_1 \\ n_2 \end{bmatrix} = N(\Pi^T - I) \quad (10)$$

where N is the matrix (right) nullspace operator.

Forward-Backward Filtering

To produce retrodicted state estimates, a data record of fixed length is recorded. This record is filtered forward and backward in time, where the forward filtering is carried out in the previous section, and the backward filtering is defined for the backward system with base state $x_b$:

$$x_b(k)=F[M(k-1)]x_b(k)+v[M(k-1)](k-1) \quad (11)$$

$$z(k)=H[M(k-1)]x_b(k)+w[M(k-1)](k), \quad (12)$$

Composing the Retrodicted Base States and Covariances

The retrodicted base states and covariances $\hat{x}_r$ and $\hat{P}_r$ are composed from the forward base states, modal states, and covariances estimates $\hat{x}_f$, $x_{1f}$, $x_{2f}$ and $\hat{P}_f$, $P_{1f}$, $P_{2f}$ and the equivalent backward counterparts as follows:

$$\hat{P}_r=(\hat{P}_f^{-1}+\hat{P}_b^{-1})^{-1}$$

$$P_{1r}=(P_{1f}^{-1}+P_{1b}^{-1})^{-1}$$

$$P_{2r}=(P_{2f}^{-1}+P_{2b}^{-1})^{-1}$$

$$\hat{x}_r=\hat{P}_r(\hat{P}_f^{-1}\hat{x}_f+\hat{P}_b^{-1}\hat{x}_b)$$

Retrodicted Modal States Update

The retrodicted modal states are computed as follows. First, define the differences processes $$\xi_1(k)=\hat{x}_r(k)-F_1\hat{x}_r(k-1)$$

$$\xi_2(k)=\hat{x}_r(k)-F_2\hat{x}_r(k-1)$$

An approximation to the covariance of these processes may be written as $$\Xi_1(k)=Q_1(k)+P_{1r}(k)+F_1P_{1r}(k-1)F_1$$

$$\Xi_2(k)=Q_2(k)+P_{2r}(k)+F_2P_{2r}(k-1)F_2$$

The likelihood functions associated with these moments assuming a Gaussian distribution is $$\lambda_{ir}(k) = \frac{1}{\sqrt{2\pi\Xi_i(k)}}\exp(-(\xi_i(k))^2/2\Xi_i(k))$$

for i=1,2. The retrodicted modal states are then produced comparing the likelihoods above:

$$\tilde{\mu}_{1r}(k)=p_{11}\mu_{1r}(k-1)+p_{21}\mu_{2r}(k-1)$$

$$\tilde{\mu}_{2r}(k)=p_{12}\mu_{1r}(k-1)+p_{22}\mu_{2r}(k-1)$$

$$c_r=\tilde{\mu}_{1r}(k)\lambda_{1r}(k)+\tilde{\mu}_{2r}(k)\lambda_{2r}(k)$$

$$\mu_{1r}(k) = \frac{\tilde{\mu}_{1r}(k)}{c_r}\lambda_{1r}(k)$$

$$\mu_{2r}(k) = \frac{\tilde{\mu}_{2r}(k)}{c_r}\lambda_{2r}(k)$$

The retrodiction method described above has a number of advantages. One advantage has been shown by simulation: the base state prediction error is much smaller and the modal state prediction more accurately follows the actual modal states with much fewer number of spurious mode changes reported. Another advantage is that as the measurement noise becomes larger relative to the process noise, the retrodiction IMM algorithm becomes noticeably more effective than the standard IMM algorithm. If the measurement noise is zero, then the whole IMM retrodiction algorithm is condensed to the "Retrodicted Modal State Update" section above, with z replacing $\hat{x}_r$ and $Q_i$ replacing $P\bullet_i$. Furthermore, the simplicity of this reduced algorithm should allow distributions other than the Gaussian distribution to be used for the likelihood function update, which could add greater accuracy to the retrodicted modal state estimate.

E. MCTF Drift Monitoring

In some communication channels, the main information carrying signal is degraded due to physical changes in the channel. For instance, in the POTS network, degradation of the signal may be due to a change in the resistance of the copper loops due to changes in temperature. One way to monitor this cause of signal degradation is by monitoring the main channel transfer function or gain coefficient. This may be done by low pass filtering the rate of change of the MCTF signal that is produced by the signal transformation block. For purposes of computational efficiency, the entire MCTF signal for bin-based data may not need to be monitored as dividing the MCTF in to quartile averages may be sufficient.

The low pass filtering may be accomplished using the IMM methodology. The corner frequency of the filter is related to the ratio of the process noise variance to the measurement noise variance. An advantage of IMM is that it allows the low-pass filter to be reset if the noise change is too large to be caused by normal temperature effects. This is accomplished by having two modes, one whose underlying Kalman filter implementation produces a low-pass filter and the other whose underlying Kalman filter implementation produces a high-pass filter. When there is a sudden change due to non-temperature effects, the change in modal states probabilities will reflect the change, and the low pass filter will reset. This effect may be used later in a Bayesian Belief Network to decide the most reliable rate of change in the MCTF signal.

II. Event Clustering

Figure 6:
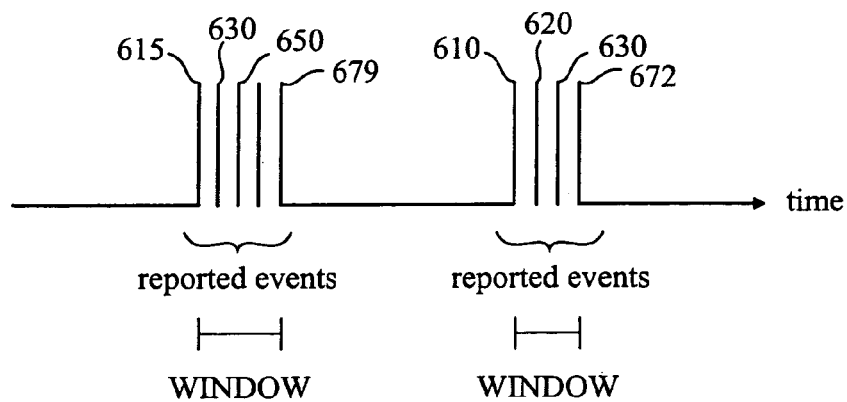
FIG. 6 depicts an exemplary timeline of events which are to be recognized as related by the event window processing layer.

Events are collected by a module known as the Event Manager. As mentioned earlier, these events are detected, in one embodiment, by individual channel processors that are a part of each transceiver in the monitored domain. Because of various delays in the processing of the individual channel processors and between the processors and the Event Manager, events that are actually related to the same cause, i.e. occurring on lines that are coupled to the same offender, may not be reported synchronously. For instance, in FIG. 6, the events 615, 630, 650 and 679 should be recognized by the system as related events even though their reporting times are quite different, while later occurring events 610, 620, 630, and 672 should also be recognized as being related. In this way, the Event Manager may collect related events over several time samples before passing the event list on to a higher processing layer for analysis.

According to an embodiment of the invention, the clustering of events may be implemented as follows. Consider a collection sample time tk. At this time, a window is either "closed" or "open." If it is closed and no events are reported from the channel processors, the window remains closed. If one or more events are reported, the window is opened by initializing two counters, $c_e$=counts the number of samples over which events have been collected $c_s$=counts the number of samples since the last collected event (silent period)

These are initialized to one and zero, respectively. Now, assume that the window is open. If no events are reported at sample $t_k$, then $c_s$ is incremented by one. If, however, one or more events are reported, $c_s$ is reset to zero. In either case, $c_e$ is incremented by one. If, at that time, either $c_e \geq c_{e,max}$ or $c_s \geq c_{s,max}$, then all events reported during the open window are passed on to the next processing layer, and the window is closed. Otherwise, no events are passed on. The counter limit $c_{e,max}$ is the maximum length of the window and $c_{s,max}$ is the maximum silent period that the Event Manager waits for another event. Other methods for clustering may be used to collect and report related events. Note that events labeled as being related at a lower processing layer may turn out not to be related as revealed by the hypothesis testing.

Use of Event Clustering to group related events into one list has several advantages. The time-stamping of channel data (for detecting events) need not have a fine temporal resolution. In other words, it may not be necessary, for the diagnosis function to yield a reliable breakdown of the likelihood of different causes for an impairment, for the system to know that one event occurred just prior to another event in a list. This is desirable because in some applications, the mechanisms for time-stamping are not synchronized. For instance, in the DSL application, events may be detected by different DSL access multiplexers (DSLAMs) which are often not synchronized. Another advantage of the clustering is that the sampling of the channel data can be relatively infrequent. Once again, it may not be necessary, for accurate diagnosis, to capture a transition in SNR with fine temporal resolution.

III. Event Analysis

According to an embodiment of the invention, events are analyzed by an Event Analysis block which may perform one or more of the following routines:

1) classification of events according to type (e.g. change in SNR or operating mode);

2) testing a hypothesis for out-of-domain lines as possible causes for an event;

3) correlate events to determine their groupings (described above in section I, Training); and 4) synthesizing crosstalk models by estimating coupling strength parameters between coupled lines.

In an embodiment of the invention, only the first and third routines are executed during training periods in which the system is establishing and refining its various models, and not the testing of hypotheses for out-of-domain lines and the synthesis of the crosstalk models. The first and third routines may be performed with a limited amount of knowledge, and hence can be done quickly and robustly. The Event Analysis module may also be responsible for maintaining an event history which allows the system to 'remember' impairment events that have occurred in a recent time period as well as their identified or postulated causes.

Whenever an event list is received, and an impairment in a communication service on a line indicated in the list has been reported, the Event Analysis module attempts to determine the cause(s) of the impairment as follows.

A. Hypothesis Testing

According to an embodiment of the invention, the primary external causes, as opposed to internal causes such as power failures or operating mode changes, for impairments or limitations on the operation of a DSL line may be classified into, for example, three categories:

Thermally induced variations in the attenuation of the line, i.e. temperature effects on the main channel transfer function of a line;

Interference from AM radio stations; and

Interference from other broad-spectrum lines (such as DSL) which may be in-domain or out-of-domain.

Note that additional or alternative impairment categories may be provided, depending upon the application. Abrupt changes in the operation of a DSL line (events) may be caused by changes in any of the categories. The changes in operation may, in turn, interfere with other DSL lines (as the third category, interference from other lines). The observed effects of these changes have sets of characteristics that may be used to distinguish them and diagnose the cause of the change with a high degree of confidence. This diagnosis is then used to build, maintain and report the significant impairment sources from each offender on each victim in the network.

One level of diagnosis of an event is its classification according to disturber type. If the cause is determined to be another DSL line, further diagnosis is done to match the observations to the effects of the set of known lines at that time. The degree of match is compared to the likelihood of a previously unknown line causing the change. If a new line is the most likely cause, then further analysis is done to determine the probabilities of the newly discovered line having a particular service type and operating mode.

Simultaneous events, i.e., multiple causes for a number of changes observed at the same time, may be handled with similar methods.

1. Cause-Effect Relationships

The offender-victim interactions may be described in terms of cause-effect relationships: a change in the transmission of the offender (cause) affects the noise observed by the victim (effect). In general, a change in the transmission of an offender will affect multiple victims in different ways. The details of the change on the victim may be modeled and the effect of the change predicted, for example, through coupling transfer functions (see the section below entitled, "Model Synthesis" for a technique for determining coupling coefficients and transfer functions. Note that these are the elements of the offender-victim connectivity matrix that was defined above in section I. Training, above.

If the change on the offender is known (i.e., the offender is in-domain), the cause-effect relationship is rather easily established by correlating the changes in time.

If, however, the offender is not monitored, a set of probabilistic hypothesis tests are set up, where the effect of each possible offender on each possible victim is predicted (based upon statistics of observed SNR changes vs. offender behavior and/or knowledge of the physical characteristics of the plant (e.g. mathematical models of channel to channel coupling, and channel to broadcast station coupling), and compared to the observed changes on the victims. This comparison may be be done probabilistically using Bayesian probability laws. For example, if two different offenders are known to be coupled (as suggested by the groupings in the connectivity matrix, see section I, Training, above) to some of the victims reporting a noise change at a particular instant, changes in the transmission of those two offenders may be hypothesized as the cause. If knowledge about the coupling strength, or transfer function, from each offender to each of the victims is available in the form of a distribution (capturing uncertainty), a probabilistic match between changes on the two offenders and the observed changes on the victims can be done, thus testing each hypothesis. The more likely hypothesis may then be selected. Alternatively, both may be rejected or accepted.

2. Representing Cause-Effect Relationships as Bayesian Belief Networks

The uncertainty inherent in the assessment of the cause-effect relationships and the conditional effects given a certain cause, in a noisy communication network may be represented in Bayesian form, or as Bayesian Belief Networks (BBNs). A BBN generally is a representation of probabilistic relationships between random variables. Such relationships are called cause-effect relationships, where the outcome, or value, of a random variable affects the probability distribution of another random variable. As an example, let a random variable C affect several random variables, numbered $V_1$ through $V_m$. In this example, each of the random variables $V_i$ can take one of a finite set of values $v_{ij}$, i=1, m and j=1, . . . , $n_i$, $n_i$ possibly different for each i, and C can take the values $c_k$, k=1, . . . $n_c$. The cause-effect relationship is based on the Bayesian relationships $$P(C = C_k) = \sum_j P(C = C_k | V_i = v_{ij})P(V_i = v_{ij})$$

for any i=1, . . . , m, and $$P(C=C_k|V_i=v_{ij})P(V_i=v_{ij})=P(V_i=v_{ij}|C=C_k)P(C=C_k).$$

The a priori probabilities of a particular victim taking a particular value are known or can be determined and the likelihood of different values of the victim is observed at the time of an event. This is used to compute the a posteriori probabilities of the different causes. This may be explained by the following example suitable for DSL applications, after which a more complete description of the use of BBNs (hypothesis testing) in interference diagnosis is given.

Figure 7:
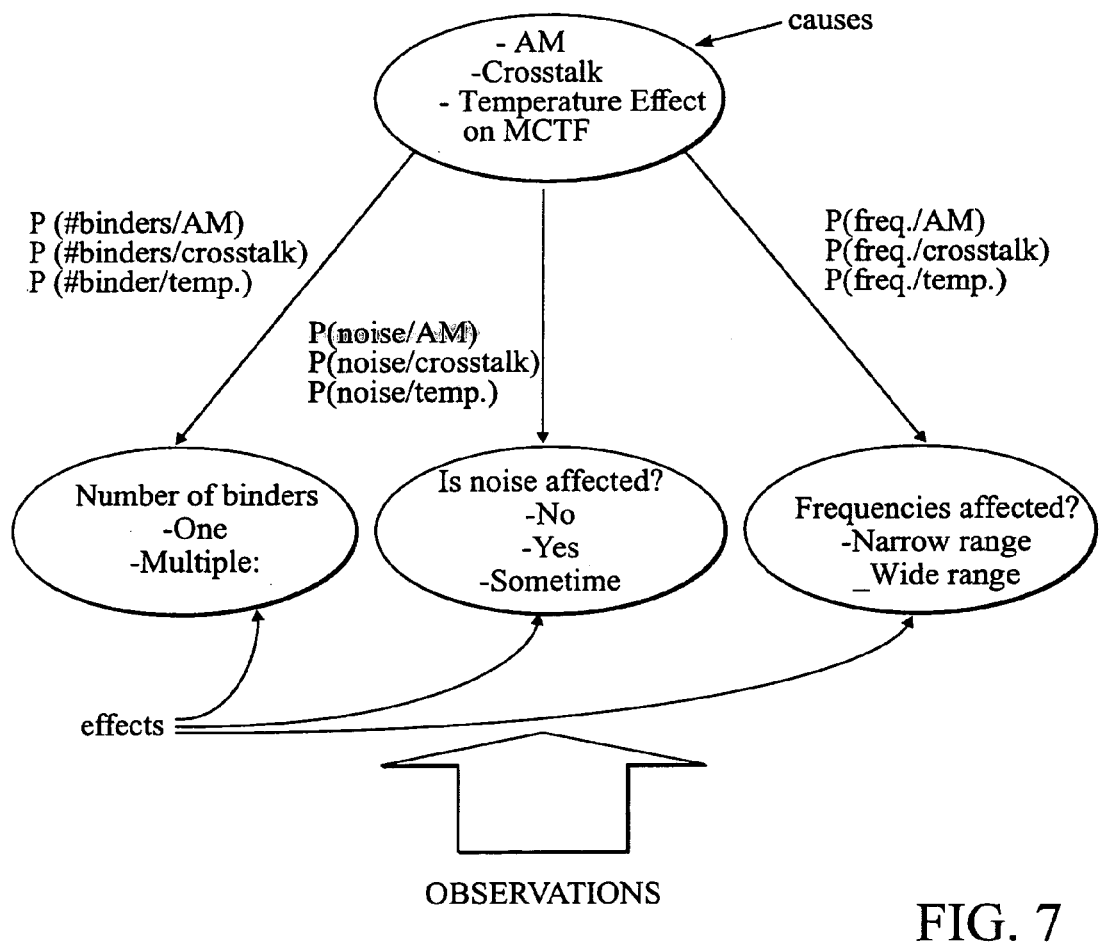
FIG. 7 illustrates an example Bayesian Belief Network (BBN) for determining the probability of a disturber type being a cause of an impairment.

Referring now to FIG. 7, an exemplary BBN is shown in which there are three possible causes for signal impairment in a victim line: AM radio or other broadcast station, crosstalk, and temperature effects on the MCTF of the line. Other combinations of causes may also be used. For the example shown, the possible "effects" are listed as three nodes: the number of binders affected with noise changes, changes in noise on the victim line, and the spectral range affected. A probabilistic relationship, in this example, a discrete conditional probability value P(effect|cause) is defined based upon statistical observations, between each cause and each effect. Thus, in this example, six conditional probability values are defined for the number of binders affected in the presence of an AM broadcast, nine are defined for crosstalk, and six are defined for MCTF-altering temperature variations. The probabilities may be called a priori information.

Such a BBN allows the relative probabilities of each possible cause being the actual cause of the impairment to be computed, based upon observations or evidence, derived from an event list and line groupings, that can be fed backwards into the "effects" nodes in the BBN to give the relative probabilities of each possible, postulated cause. For instance, if a wide spectral range of noise was observed repeatedly over time in one binder, then the BBN would indicate a high probability for crosstalk as being the cause, with substantially lower probabilities for AM interference and temperature effects depending upon the a priori conditional probabilities that were initially defined.

The same approach may be expanded to more complex BBN diagrams and potentially to BBNs with different heirarchical levels, to obtain finer granularity in impairment diagnosis. For instance, the line grouping obtained from the connectivity matrix may be used to increase the number of different effects that could be possible. Other variations to BBN diagrams are described below. For additional information on the use of BBNs, see U.S. patent application Ser. No. 09/345,172, entitled "Real-Time Planner for Design" by Sunil Shah et al., assigned to Voyan Technology Inc., and filed on Jun. 30, 1999.

A general BBN representation can be used for diagnosing the cause C of effects observed on m victims $V_1$ through $V_m$. Here, the cause can be one of several possibilities, such as a known object reporting a change, a postulated, but unknown, object, or a new unknown object. The effects on victims $V_1$ through $V_m$ can be in continuous form as the strengths of the observed noise changes, or in discrete form as "was the victim affected or not?" All objects reporting a chance are included, as are all objects expected to have coupling to the possible offenders (and thus expected to produce a report).

The BBN may be generated dynamically to facilitate using the same structure for many different situations. For example, the number of possible victims depends on where in the network the events occur and the possible cause depend on which victims are being considered.

3. Disturbance Classification

As discussed above, according to an embodiment of the invention, the primary classes of causes of impairment in a channel may be thermal, interference from broadcast stations or appliances, and crosstalk from other transmission channels. In addition, the operation of a channel may change due to internal effects, such as loss of power or forced reset at a trasceiver. To establish the cause of an event, one level of hypothesis testing follows a similar classification to determine in which category the cause is most likely.

In the remainder of this section, it is assumed that the event is caused by a single change. Simultaneous changes will be discussed in the following section.

The classification done at this level sets up one or more of the following hypotheses, for an exemplary DSL application:

The event was caused by a change in the line itself (internal or thermal).

The event was caused by a change in the AM ingress noise.

The event was caused by another transmission line.

The probability of each cause is determined by propagating a set of observations backwards through a BBN. The most likely category or categories are then diagnosed further. Some examples of observations used to estimate the cause-effect probabilities are listed below. Each one corresponds to a BBN effect node, whose current states are also listed.

The number of lines reporting a change in noise.
    None|Few|Some|Many
The number of lines reporting a change in the main-channel transfer function.
    None|Some
The lines reporting a change in their operation (mode).
    None|Only on lines also reporting noise changes|Other lines also
The spectral ranges of the reported noise changes.
    Low|High and wide|High and narrow
Which sides of the lines the reports come from.
    One side only|Both sides for a few lines|Both sides for many lines.
The rate of SNR changes
    Slow|Fast|Both
The number of binders affected
    One|Many The conditional probability mass functions from the possible causes to the effects are to be provided to the system from statistical information (collected over time as the system is running and/or during certain designated data collection periods) as well as mathematical models of coupling between channels and with external disturbers. For example, statistical information as well as knowledge of electromagnetic coupling reveals that an internal change in the operation of a line (first category) by itself is most likely to result in few or no noise change reports and affect low frequencies. In contrast, changes in AM interference are most likely to cause noise change events being reported on a number of channels and affect high frequencies in a narrow region.

a) Category: Internal Change

The rate of change in the main-channel transfer functions of the victims may be compared to the overall estimate of the current rate of temperature change, and the operating state of the line before and after the event may be compared (for example, was it turned off?) to obtain additional information in the diagnosis. Such diagnosis will help distinguish between thermally induced events and other internal events.

b) Category: AM Interference

Further diagnosis of this category may include identifying the frequency of the AM station causing the change. The resolution of that identification may be significantly better if spectral information is available from some of the victims.

c) Category: Interference from Another Line

If the cause of the event is interference from another line, further characterization of that line is attempted. The detail of characterization depends on whether the offender is in-domain or out-of-domain.

i) Impairment from In-Domain Offenders

When the event is caused by a change in an in-domain line, the characterization is as follows. Since the line is reporting its mode change at approximately the same time as the impairment changes are reported, time correlation identifies one with the other. Moreover, because the offender is in-domain, the exact service type, operating mode, and transmitted power of the offender are known. This information is then used to identify the offending line precisely, estimate the coupling strength from the offender to the victim, and estimate the total impairment caused by the offender.

ii) Impairment from Previously Identified Out-of-Domain Offenders

To determine if the event was caused by one of the lines that have been identified already, and to obtain a measure of the output power on such an out-of-domain line, a BBN may be set up dynamically using one or more of the following:

Each victim line is included as an effect node
Each offender coupled to a set of the victims is included as a possible cause in the cause node
Each line that is not a victim but is coupled to one of the possible offenders is included as an effect node
Any observed bin information is included as an effect node The conditional probabilities are computed using an estimate of the mean and covariance of the coupling strength and the transmitted spectrum for that service category if the coupling strength has been estimated. Otherwise, a generic coupling is used.

Priors, in this case probabilities of the causes, may be obtained from the remaining lines in the binder, if known (or estimated), and otherwise defaults are used. The priors may change with the identification of the network.

The observations are entered into each effect node:
Each observed noise change is entered
The bins affected are entered
Any missing, but expected noise change (as suggested by the connectivity matrix) is entered as zero
Any missing and expected noise change with unknown coupling is entered with a large variance Finally, a single hypothesis is added that represents an out-of-domain offender that has not yet been identified at all. The conditional probability density function for each of the victims given that cause is a large variance and thus captures events that do not match any of the other hypotheses.

For out-of-domain offenders, the probability of each possible service category and operating mode (after the event) is maintained through a state that is updated whenever an event is most likely to have been caused by that offender. This process may be described as follows. Let $\underline{m}_j(i)$ be the a priori probability of the ith operating mode of a hypothesized offender corresponding to the jth service category immediately before an SNR change event is observed on the victim. The length of the vector $\underline{m}_j$ corresponds to the number of possible operating modes of jth service category. Similarly let $\overline{m}_j$ be a posteriori probability of a hypothesized offender corresponding to the jth service category immediately after an SNR change event is observed on the victim. The value of $\overline{m}_j$ is produced by the product $$\overline{m}_j = \Pi_j \underline{m}_j$$

where the entries of $\Pi_j$ are produced by hypothesis tests performed by a BBN. The matrix $\overline{M}$ is produced by collecting the vectors $\overline{m}_j$ within a matrix, i.e., $$\overline{M} = [\overline{m}_1 \ \overline{m}_2 \ \ldots \ \overline{m}_n].$$

The joint a posteriori probability $\overline{P}$ matrix of the service category and mode may be produced from $\overline{M}$ by multiplying each column by the marginal probability of the corresponding service category, i.e., $$\overline{P} = [\overline{m}_1 p_1 \ \overline{m}_2 p_2 \ \ldots \ \overline{m}_n p_n].$$

The matrix $\overline{P}$ represents the probability state of the offender and is maintained for each out-of-domain offender.

Figure 8:
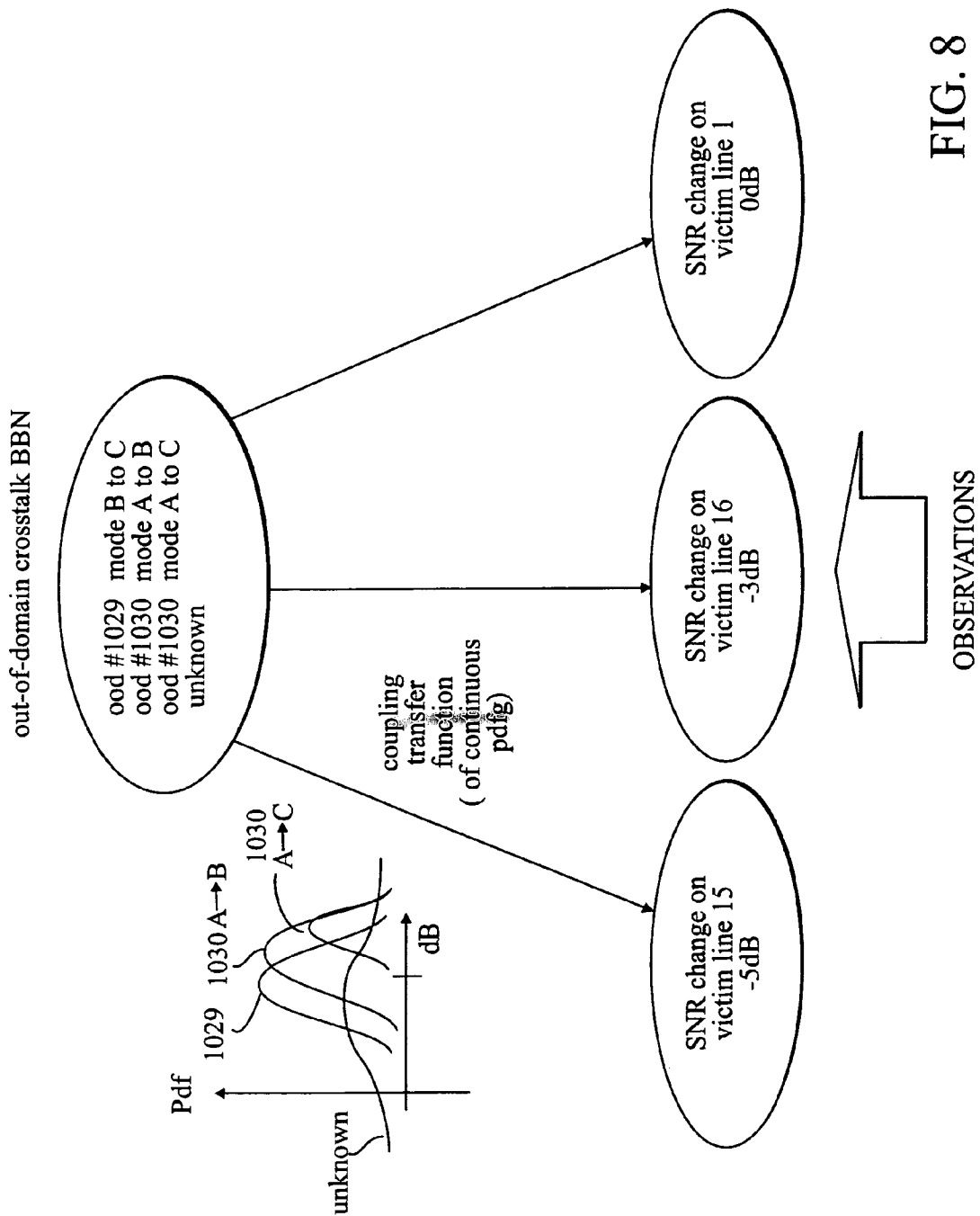
FIG. 8 shows another example of a BBN, this one for determining the probability of an out-of-domain line being a cause of an impairment.

An example BBN for diagnosing out-of-domain crosstalk based on the above-described technique for out-of-domain offenders is shown in FIG. 8. Note how the coupling transfer function between the possible causes and effects (both being changes on lines) are probability density functions (pdfs) rather than discrete conditional probabilities (cf. FIG. 7). That is because the coupling between the out-of-domain lines and the victim lines is not deterministic, since the output power of the out-of-domain lines are not being monitored.

Once again, working backwards into the BBN, an observation, such as a reduction in SNR on the victim line 15 (may be per bin or an aggregate number), is used to index into the pdf plots from which four probability values (corresponding to the four postulated causes) are obtained. The output power of each out-of-domain cause is obtained by a predetermined knowledge of the change in output power for the given modes. High confidence predictions of the cause can be used to refine the coupling transfer function models (pdfs) between that cause (out-of-domain line) and in-domain victim lines.

iii) Service Recognition for Unknown Out-of-Domain Offenders

If the comparison for known out-of-domain lines does not result in a good match, the most likely hypothesis is that the event was caused by an out-of-domain offender that has not yet been identified. In that case, the joint probability mass of the service category and operating mode transition on that line are derived. A BBN similar to the one above is set up dynamically, where the change on each victim is set up as an effect node and each possible service type and mode transition are set up as cause hypotheses.

The prior probabilities for each service category are computed based on an estimate of the lines of that service category remaining in the binder in which the victims are. This estimate is obtained from the service distribution and penetration of the binder (available either from configuration data for that binder or from prior statistics).

When no bin-based information is available from the victims, then the conditional probabilities are derived from prior statistics collected on the effects of changes in a particular offender service type on the noise observed on another service type. The conditional probabilities are expressed as either discrete mass functions directly representing the coupling statistics, Gaussian approximations of those statistics, or other approximations.

The observations entered as evidence are, as before, the observed noise changes in the victims and the frequency ranges affected. If sufficient bin-based information is available, it is used and the weight of the above prior statistics is reduced.

4. Simultaneous Offender Changes

The above discussion may have implicitly assumed that there is a single cause for each event. This is not always true, although the probability of simultaneous causes is expected to be small for any given grouping or, for DSL applications, any given binder.

To reduce the number of simultaneous events that need to be diagnosed, no diagnosis is attempted until sufficient information about grouping of the victims into binders or other groups has been collected. This grouping is done by time correlation during training periods as described above, and may be initialized with the binder configuration data, if available. Once this has been done, event reports are separated by groups before being passed on to the Event Analysis module. After that, simultaneous events need only be diagnosed on a group-by-group basis.

A mechanism for doing this is by observing when the hypothesis tests for classification or known out-of-domain lines have become inconclusive. In this case, more than one likely causes may be the conclusion.

5. Assessment of Confidence

Various probabilistic measures of the quality of the diagnosis may be of interest. For example, the confidence that $\hat{n}_i(f)$ represents the most significant offenders, $$P(\hat{n}_i \geq \alpha n_i)$$

where $\alpha < 1$ represents the significance and $n_i$ is the total effect on the victim, is computed from the probability distributions of the variables above and the probabilistic assessment of the cause. Using this, the "best" estimate may be found according to a particular criterion. For example, the fewest number of disturbers representing at least a certain percentage of the observed noise with a given confidence may be found, minimize the number of lines m such that $P(\hat{n}_i \geq \alpha n_i) > P_{min}$ As another example, the confidence may be maximized subject to not overcounting the number of victims by too much, maximize $P(\hat{n}_i \geq \alpha n_i)$ such that the number of lines m is less than $\beta$ times the actual number of strong disturbers.

B. Coupling Transfer Function Model Synthesis

In one embodiment, each coupling transfer function takes on a value H (in dB for instance) with a standard deviation. Since the victim noise, per offender, may be defined as (impairment contribution by the offender)*(total noise)= (coupling, $H$)*(output of disturbing source), H can be computed by the following method. A number of measured values for total noise are obtained from the victim line. A corresponding number of disturber output values are either measured (in-domain offender) or synthesized (out-of-domain offender) using a BBN as described above. A linear relationship is assumed between H and disturber output, and finally a parameter estimation technique, such as recursive least squares (RLS), is applied to obtain the optimal value of H for the set of total noise, impairment contribution, and disturber output values. The following is a detailed example of such a procedure.

Let $u_i$ be an input to a linear system at time i, $x_i$ be its output, and $y_i$ be its measured output. Further define:

$x_k = [x_1, x_2, \ldots x_k]$
$u_k = [u_1, u_2, \ldots u_k]$
$y_k = [y_1, y_2, \ldots y_k]$ The state equation describing the relationships between u, x, and y may be written as follows:

$x_k = H u_k; \quad y_k = M x_k + v,$

Here H is an unknown parameter to be identified, M is a structured matrix giving the relationship between the state and the measurements, and v is a noise term. Given this problem description, then identification of the unknown parameter H may be cast as a least-squares parameter estimation problem. In such a case, the parameter $\Theta = MH$ that minimizes the norm of the residual at time k is $$\Theta_k = (y_k u_k^T)(u_k u_k^T)^{-1}$$

$$= \Psi_k \Phi_k^{-1}$$

where $\Psi_k \equiv y_k u_k^T$ and $\Phi_k \equiv u_k u_k^T$.

This formulation admits two recursive forms. The first recursive form propagates $\Phi$ and $\Psi$ separately. Whenever a parameter estimate $\Theta$ is desired, a linear system may be solved to compute it:

$$\Phi_{k+1} = \Phi_k + u_{k+1} u_{k+1}^T$$

$$\Psi_{k+1} = \Psi_k + y_{k+1} u_{k+1}^T$$

$$\Theta_{k+1} = \Psi_{k+1} \Phi_{k+1}^{-1}.$$

The second recursive form propagates $\Phi^{-1}$ and $\Theta$ directly:

$$\Phi_{k+1}^{-1} = \Phi_k^{-1} - \Phi_k^{-1} u_{k+1}(I + u_{k+1}^T \Phi_k^{-1} u_{k+1})^{-1} u_{k+1}^T \Phi_k^{-1}$$

$$\Theta_{k+1} = (I - \Phi_k^{-1} u_{k+1}(I + u_{k+1}^T \Phi_k^{-1} u_{k+1})^{-1} u_{k+1}^T)$$
$$\Theta_k + \Phi_{k-1} y_{k+1} u_{k+1}^T)$$

The first form has the advantage in that $\Phi$ may be initialized to zero. It also is advantageous in that $\Phi$ may be propagated as a sparse matrix (linked-list) regardless of the ordering of the elements. Furthermore, the linear system $\Phi \Theta = \Psi$ may be solved quite efficiently. First, since the matrix $\Phi$ may be thought of as quantifying information about the system, a simple thresholding routine may be applied to eliminate small entries, which have little information before inversion. Second, the entries of the thresholded matrix may be reordered by a symmetric sparse-matrix reordering algorithm, like the symmetric minimum degree algorithm, which block diagonalizes the matrix. This guarantees that the Choleski factorization necessary for inverting the linear system will also be sparse. The reordering is also useful in that it essentially assigns services to sets of non-interacting groups.

The second recursive form has the advantage that the information matrix $\Phi$ is propagated as a covariance matrix $\Phi^{-1}$ eliminating the need for inversion; however, this method should only be used when a sparse reordering has been performed, otherwise the matrix $\Phi^{-1}$ will not be sparse. Thus only the first recursion should be performed until $\Phi$ is reasonably well conditioned and enough data is collected to produce a good reordering. It should be noted that both recursive forms allow older data to be multiplied by an exponential forgetting factor, minimizing the influence of older data.

This algorithm may be applied to the problem of the identification of in-domain Near End Crosstalk Transfer Functions (NEXTs), as well as aggregate out-of-domain disturber couplings by DSL type. As an illustration and referring to FIG. 9, the algorithm is applied to a problem in which it is assumed that there are two in-domain services ($u_1$, and $u_2$ as input, $y_1$ and $y_2$ as measured outputs) as well as two types of out-of-domain DSL services $T_1$ and $T_2$, (unknown power levels that will be statistically estimated). There are two NEXTs to be identified, $H_{12}$ and $H_{21}$, as well as four out-of-domain coupling coefficients, $beta_{11}$, $beta/_{12}$, $beta_{21}$, and $beta_{22}$. Although the following description refers to a DSL application, the concepts may also be applied to other types of communication systems that are to be diagnosed.

The first in-domain service may be, for this example, a DMT service where the cross-coupling signal (appearing as noise) may be measured on all of the channels. The second in-domain service may be a single-carrier (SC) service, where only the aggregate cross-coupling signal may be measured. The inputs $u_1$ and $u_2$ are vectors containing the input spectra of the DSL services. The inputs $T_1$ and $T_2$, are predetermined vectors containing the input spectra of the two individual out-of-domain DSL services multiplied by a function whose shape is characteristic of a NEXT transfer function. The output vectors $y_1$ and $y_2$ are the measured noises from DSL modems. Since the first service is a DMT modem, the output $y_1$ is a vector and the output matrix $M_1$ is assumed to be the identity matrix, i.e., $M_1 = 1$ Similarly, since the second service is an SC modem, the output $y_2$ is a scalar and the output matrix $M_2$ is assumed to be a row vector containing ones, i.e., $M_2 = h^T = [1,1, \ldots 1]$.

The identification of the transfer functions $H_{ij}$ as well as the coupling coefficients $beta_{ij}$ may be written in the RLS framework as follows. Each new measurement produces the equation $$\begin{bmatrix} y_1(k) \\ y_2(k) \end{bmatrix} = \begin{bmatrix} 0 & \mathrm{diag}(u_2) & T_{11} & T_{12} & 0 & 0 \\ h^T \mathrm{diag}(u_1) & 0 & 0 & 0 & h^T T_{21} & h^T T_{22} \end{bmatrix} \begin{bmatrix} H_{12} \\ H_{21} \\ \beta_{11} \\ \beta_{12} \\ \beta_{21} \\ \beta_{22} \end{bmatrix},$$

which conforms to the RLS framework. In this example, a multi-input/multi-output form of the RLS equation is used. In practice, only single-input/single-output are generated, with only the interaction between the ith and jth service computed. This greatly simplifies the model synthesis. It also makes the algorithm initialization simpler in that the first RLS recursion may be used, namely that which propagates the information matrix ● instead of its inverse. In this case, ●0●●=0.

In addition to computing the transfer function model H=●●−●●, its variance is also computed. Theoretically, the variance of the transfer function H is proportional to the inverse of the information matrix: ●●−●. However, the measurement of the data from which ● and ● are constructed does not correspond to the theoretical model. Thus the variance of H is computed by adding the theoretical variance to the variance derived from from an ensemble of instantaneous transfer function values h=●y/●u. The ensemble length may be set by a parameter in a configuration file. All but the last element of the ensemble are the instantaneous values of the transfer function $h_k$=●$y_k$/●$u_k$. The last element of the ensemble is the RLS averaged transfer function $H_k$=●$y_k$●⁻●$u_k$. The heuristic of adding the RLS averaged transfer function $H_k$ to the ensemble is motivated by the desire to take into account a long term average of the transfer function in the (shorter term) ensemble average.

The model synthesis algorithm may be organized as a linked list. The elements of the models are stored in a structured vector, v. The indexing of the models in the structured vector v may be accomplished by using a sparse indexing matrix, M. If the v(m) contains the model for the crosstalk transfer function between the ith and jth service, then M(i,j)=m.

The following should be noted. First, it is assumed that during training, the in-domain inputs to the system ($u_i$) may be turned off and on as desired, during which time the out-of-domain inputs ($T_{ij}$) remain on. One consequence of this is that during training the amount of out-of-domain services that may be identified on the ith service is less than or equal to the dimension of the associated output vector $y_i$. For DMT services, there is sufficient excitation to identify all of the coupling coefficients. For SC services, only a single aggregate out-of-domain excitation may be identified. Nevertheless, it should be possible to identify individual out-of-domain services after training by noticing noise level changes associated with out-of-domain services going idle. When these services go idle, the type of service may be hypothesized based on the change in noise level over all of the measured frequency bins. Also, since services may be assumed to go idle one at a time, it should be possible to apply the same identification scheme to out-of-domain services as in-domain services, with the hypothesized excitations $u_i$ entered in the regressor matrix.

Figure 9:
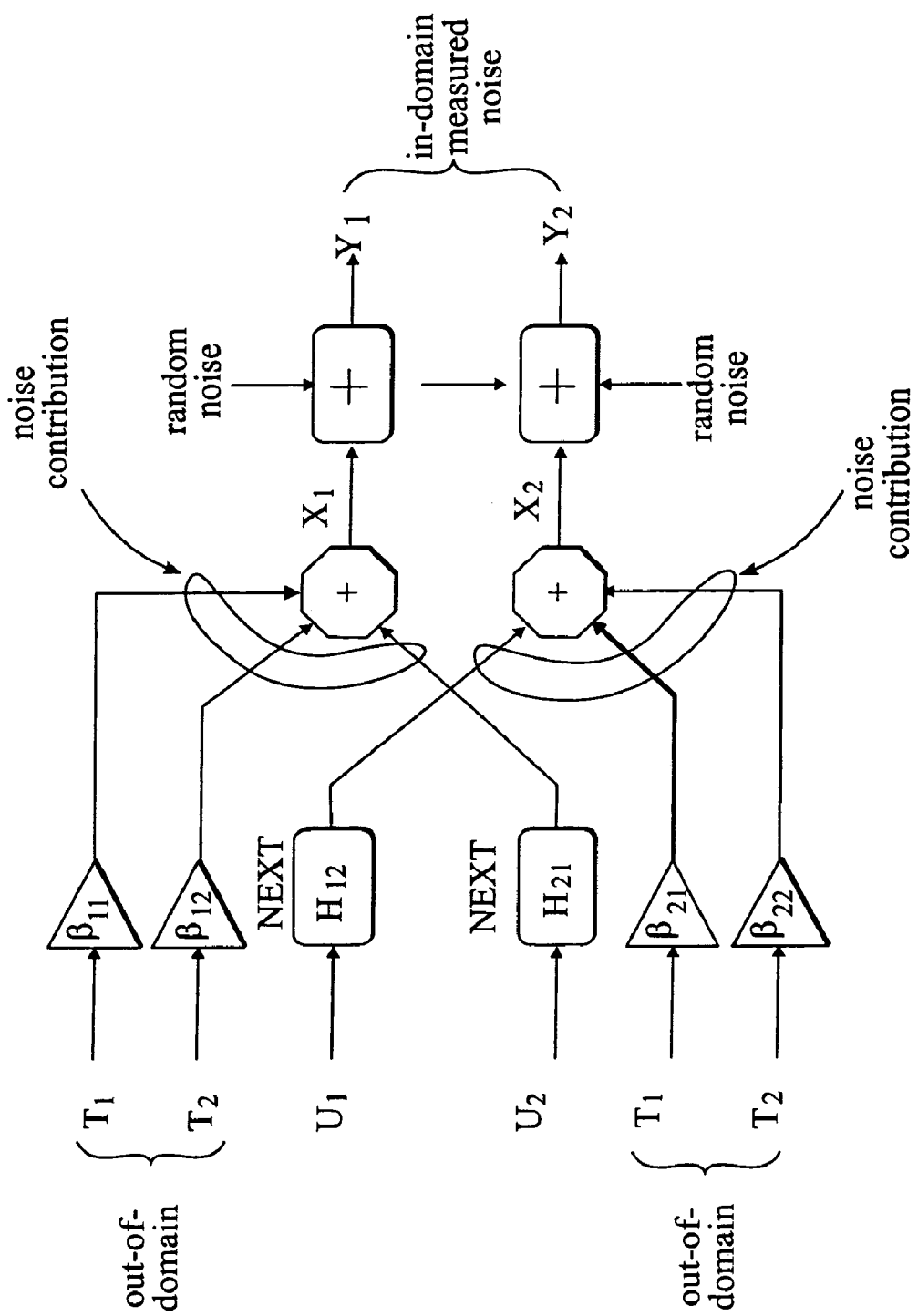
FIG. 9 depicts a block diagram of multiple disturber model synthesis example.

Another element to note in the identification scheme is the assumption that there is reciprocity in the NEXT transfer functions: The NEXT transfer function from the ith to jth service is the same to the jth to ith service. Thus, $H_{12}$ and $H_{21}$ in FIG. 9 are the same.

In addition, since the RLS algorithm explicitly updates either the information matrix ● or the covariance matrix ●⁻¹, it is possible to improve the quality of the parameter identification by examining the extremal singular vectors of ●● or ●⁻¹●● Since the solution of the identification process is more accurate when the condition number of ●● is small, the excitation may be adjusted to increase the component of ● along the minimum singular vector or to decrease the component of ●●⁻● along the maximum singular vector. This provides a method for deciding on the fly how to adjust the excitation of the system to minimize the covariance of the identified parameters given a fixed amount of measurement noise.

One issue that also arises is the issue of training time. As is typical of most RLS algorithms, formulations with smaller parameter dimension more quickly converge. A reduced order formulation may be accommodated by propagating two separate recursions. The first would reduce the effective number of outputs of a DMT type DSL modem to one aggregate output by summing all of the noise outputs for all of the frequency bins, while the second could be propagate all of the frequency bins separately. Since the first is smaller, it should show faster convergence. This would allow any reordering routine to be run earlier and more efficiently. The resultant reordering could then be transferred to the larger system, eliminating the need for additional reordering.

The method described above to identify the NEXT transfer functions has the advantage that the parameterization is linear. Nevertheless, it may be worthwhile to identify a low-order physical model of the NEXT transfer function based on a polynomial fraction or RLC network. While this has a non-linear parameterization, it may be advantageous in that it is a model of lower dimensionality.

C. Impairment Estimation

A goal of the detection and diagnosis system is to provide a diagnosis report of impairment on a victim, such as the example shown below for a DSL application:

Victim #15
Line 970 20%
AM 10%
2 out-of-domain
SDSL 30%
SDSL 10%

In a particular embodiment of the invention, during operation, the impairment caused by each significant offender on each victim is estimated after each event. To do this, the identified coupling transfer functions and the known operating modes for the in-domain offenders are used. For out-of-domain offenders, a transfer function is maintained for each possible service type for the offender, along with the joint probability of each service type and operating mode. This is used together to compute a weighted average estimate of the impairment. Percentage is computed from the observed total noise on the victim.

1. Definitions

At any point, the state may have the following components that are used by the impairment estimation technique:

The service type $s_j$ and current operating mode $m_j$ of each in-domain line j.

A model of the coupling strength ($h_{jk}$, $\sigma^2_{jk}$) from each significant in-domain offender j on each victim k as expected value and variance.

The a posteriori joint probability mass $P_j$ of each service type and each operating mode for each out-of-domain line j. This joint probability is updated by the hypothesis testing methodology every time an event is believed to have been caused by line j. This is an $n_p \times n_q$ matrix, where $n_p$ is the number of possible operating modes and $n_q$ is the number of possible service types.

A model of the coupling strength ($h_{q,jk}$, $\sigma^2_{q,jk}$) from each significant out-of-domain offender j on each victim k and for each offender service type q as expected value and variance.

The latest estimate of the ingress noise $a_{ik}$ from each ingress noise source i on each line k.

The total noise $N_k$ reported by each line k.

2. Impairment Estimation for In-Domain Offenders

For in-domain offenders, the noise contribution on a particular victim is estimated as $$\hat{y}_{yk} = h_{jk} u_j$$

where $u_j$ is an estimate of the total offender noise as seen by the victim, given its service type and received spectrum.

Similarly, the variance of this value is computed from the variance of the coupling estimate, $$\hat{v}_{jk} \sigma^2_{jk} |u_j|^2$$

The percentage contribution is computed as a percentage of the total noise reported by the victim, $$\hat{r}_{jk} = \frac{\hat{y}_{jk}}{N_j}$$

and the range is similarly computed from the standard deviation.

Impairment Estimation for Out-of-Domain Offenders

For out-of-domain offenders, the noise contribution on a particular victim is estimated by probabilistic mixing of disturbance estimates for each possible service type and operating mode for the offender.

Let $\hat{n}_{pq,jk}$ be the impairment estimate assuming a offending service type q and operating mode p. Then, as for the in-domain offenders, $$\hat{n}_{pq,jk} = h_{q,jk} u_{pq,j}$$

where $u_{pq,j}$ is an estimate of the total offender noise as seen by the victim, given this offender service type and operating mode and its service type and received spectrum.

Similarly, the variance of this value is computed from the variance of the coupling estimate, $$\hat{v}_{pq,jk} = \Sigma^2_{pq,jk} |u_{pq,j}|^2$$

Next, compose the $n_p \times n_q$ matrices $$Y_{jk} = \lfloor \hat{n}_{pq,jk} \rfloor$$

$$V_{jk} = \lfloor \hat{v}_{pq,jk} \rfloor$$

with entries for each operating mode and service type for offender j.

Then, define the following matrices and operators:

⟨M⟩: The sum over all of the elements in M.

P∘Q The Hadamard (element by element) product of matrices P and Q.

H: A matrix of ones.

Applying the rules of Bayesian statistics to mixed Gaussian random variables whose first and second order moments are defined by $Y_{jk}$ and $V_{jk}$, and the joint probability is defined by $P_j$, the optimal noise estimate for the noise on victim k from offender j is $$\hat{y}_{jk} = \langle P_j \circ Y_{jk} \rangle$$

Similarly, the optimal estimate for the variance of the noise is $$\hat{v}_{jk} = \langle P_j \circ (V_{jk} + (Y_{jk} - \hat{y}_{jk} H) \circ (Y_{jk} - \hat{y}_{jk} H)) \rangle.$$

The standard deviation may be computed by simply taking the square root of the variance, $$\hat{\sigma}_{jk} = \sqrt{\hat{v}_{jk}}.$$

As for the in-domain offenders, the percentage contribution is computed as a percentage of the total noise reported by the victim, $$\hat{r}_{jk} = \frac{\hat{y}_{jk}}{N_j}$$

and the range is similarly computed from the standard deviation.

4. Impairment Estimation for Ingress Noise Sources

The percentage contribution from each ingress noise source i is computed as a percentage of the total noise reported by the victim, $$\hat{r}_{jk} = \frac{a_{ik}}{N_j}.$$

The total ingress noise is the sum of those components for all i.

5. Scaling of Percentage Contributions to Fit 0–100% Range

Before reporting, the estimated percentage contribution from each offender on a victim is scaled so that the total contribution is reasonable. This scaling takes both the expected value and the variance of the estimate into consideration.

To summarize, various embodiments of a technique for the detection and diagnosis of interference in a communication network have been described. In the foregoing specification, the invention has been described with reference to specific exemplary embodiments. It will, however, be evident that various modifications and changes may be made thereto without departing from the broader spirit and scope of the invention as set forth in the appended claims. For instance, the technique may be used in fields other than DSL service deployment, such as diagnosing impairments to network packet flow through a router or a network of routers. The detailed description and the drawings are, accordingly, to be regarded in an illustrative rather than a restrictive sense.

What is claimed is:

1. A method comprising:
   1) determining the number of disturber signals on a channel;
   2) generating an ideal disturber signal model of an ideal disturber signal for each of the disturber signals;
   3) comparing the ideal disturber signal model with an actual signal on the channel to generate an estimation of a co-channel of the disturber signal; and
   4) repeating steps 1)–3) as necessary until all the co-channels of the disturbers are identified.

2. The method of claim 1 further comprising:
   a) detecting events that occur in a plurality of in domain communication channels where each channel is used by a communication service; and
   b) determining the probability of each of a plurality of possible causes as being a cause of interference in a victim channel, by propagating observations of the interference backwards through a Bayesian Belief Network (BBN) which defines a probabilistic cause-effect relationship between each cause and each effect.

3. The method of claim 1 further comprising:
   monitoring events and causes on a channel;
   correlating events and causes; and
   postulating out-of-domain offenders based upon in-domain activity.

4. The method of claim 1 further comprising:
   detecting a service type existence.

5. The method of claim 4 wherein the service type existence is detected by identifying/characterizing at least one disturber signal on the channel.

6. The method of claim 4 wherein detecting the service type existence is focused on at least one particular frequency range in a case where it is known that a particular service type may cause a disturbance on the channel.

7. The method of claim 1 wherein determining the number of disturber signals on the channel includes:
   determining a disturber/noise power, wherein if the disturber power is above a critical threshold;
   identifying a source of the disturber; and
   identifying a frequency of the disturber.

8. The method of claim 1 further comprising:
   prioritizing the sources of the disturbers from highest to lowest disturber power.

9. The method of claim 1 further comprising:
   5) detecting a service type existence;
      the determining of the number of disturber signals on the channel, including:
         determining a disturber/noise power, wherein if the disturber power is above a critical threshold;
         identifying a source of the disturber; and
         identifying a frequency of the disturber;
      the repeating of steps 1)–3) including repeating steps 5) and 1)–3) as necessary until all sources of the disturbers are identified.

10. The method of claim 9 wherein the service type existence is detected by identifying/characterizing at least one disturber signal on the channel.

11. The method of claim 9 wherein detecting the service type existence is focused on at least one particular frequency range in a case where it is known that a particular service type may cause a disturbance on the channel.

12. The method of claim 9 further comprising:
    prioritizing the sources of the disturbers from highest to lowest disturber power.

13. A computer readable medium containing executable instructions which, when executed in a processing system, causes said system to perform a method, the method comprising:
    1) determining the number of disturber signals on a channel;
    2) generating an ideal disturber signal model of an ideal disturber signal for each of the disturber signals;
    3) comparing the ideal disturber signal model with an actual signal on the channel to generate an estimation of a co-channel of the disturber signal; and
    4) repeating steps 1)–3) as necessary until all the co-channels of the disturbers are identified.

14. The computer readable medium of claim 13 further comprising:
    detecting a service type existence.

15. The computer readable medium of claim 14 wherein the service type existence is detected by identifying/characterizing at least one disturber signal on the channel.

16. The computer readable medium of claim 14 wherein detecting the service type existence is focused on at least one particular frequency range in a case where it is known that a particular service type may cause a disturbance on the channel.

17. The computer readable medium of claim 13 wherein determining the number of disturber signals on the channel includes:
    determining a disturber/noise power, wherein if the disturber power is above a critical threshold;
    identifying a source of the disturber; and
    identifying a frequency of the disturber.

18. The computer readable medium of claim 13 further comprising:
    prioritizing the sources of the disturbers from highest to lowest disturber power.

19. An article of manufacture comprising a program storage medium readable by a computer and tangibly embodying at least one program of instructions executable by said computer to perform a method, the method comprising:
    1) determining the number of disturber signals on a channel;
    2) generating an ideal disturber signal model of an ideal disturber signal for each of the disturber signals;
    3) comparing the ideal disturber signal model with an actual signal on the channel to generate an estimation of a co-channel of the disturber signal; and
    4) repeating steps 1)–3) as necessary until all the co-channels of the disturbers are identified.

20. The article of manufacture of claim 19 further comprising:
    detecting a service type existence.

21. The article of manufacture of claim 20 wherein the service type existence is detected by identifying/characterizing at least one disturber signal on the channel.

22. The article of manufacture of claim 20 wherein detecting the service type existence is focused on at least one particular frequency range in a case where it is known that a particular service type may cause a disturbance on the channel.

23. The article of manufacture of claim 19 wherein determining the number of disturber signals on the channel includes:
    determining a disturber/noise power, wherein if the disturber power is above a critical threshold;
    identifying a source of the disturber; and
    identifying a frequency of the disturber.

24. The article of manufacture of claim 19 further comprising:
    prioritizing the sources of the disturbers from highest to lowest disturber power.

* * * * *

UNITED STATES PATENT AND TRADEMARK OFFICE
CERTIFICATE OF CORRECTION

| | |
|---|---|
| PATENT NO. | : 6,970,560 B1 |
| APPLICATION NO. | : 09/710703 |
| DATED | : November 29, 2005 |
| INVENTOR(S) | : John Josef Hench et al. |

It is certified that error appears in the above-identified patent and that said Letters Patent is hereby corrected as shown below:

On the title page, item (56) References Cited,
Page 2, OTHER PUBLICATIONS, line 34 reads "...Guanghan Xu et al., IEEE Transactions in Singal Process-,..." and should read -- ...Guanghan Xu et al., IEEE Transactions in Signal Process-,... --.

Page 2, OTHER PUBLICATIONS, line 37 reads "Alexanda Duel-Hallen et al., IEEE Transactions on Com-,..." and should read -- Alexandra Duel-Hallen et al., IEEE Transactions on Com-,... --.

Column 1, line 46 reads "...transmitted over wires, cable, fiber optics wireless, or other..." and should read -- ...transmitted over wires, cable, fiber optics, wireless, or other... --.

Column 9, lines 32-33 read "...value (computed over the entire spectrum of a communication channel.) For instance, the probabilistic cause-effect ..." and should read -- ...value (computed over the entire spectrum of a communication channel). For instance, the probabilistic cause-effect ... --.

Column 11, line 45 reads "...services in the time interval $T \equiv t\ \beta[T, T+dT]$, where dT..." and should read -- ...services in the time interval $T \equiv t\ \epsilon[T, T+dT]$, where dT... --.

Column 11, lines 45-46 reads "...where dT a small length of time on the order of one to a small..." and should read -- ...where dT is a small length of time on the order of one to a small... --.

Column 11, lines 51-52 read "...measured levels of noise the time interval $T \equiv t\ \beta[T, T+dT]$. The list M is a vector whose entries correspond..." and should read -- ...measured levels of noise the time interval $T \equiv t\ \epsilon\ [T, T+dT]$. The list M is a vector whose entries correspond... --.

Column 12, line 67 reads "A(3,3) A(3,3)+1=2" and should read -- A(3,3)=A(3,3)+1=2 --.

Column 13, line 51 reads, "A. Forced Training" and should read -- Forced Training: --. (no indent)

UNITED STATES PATENT AND TRADEMARK OFFICE
CERTIFICATE OF CORRECTION

PATENT NO.       : 6,970,560 B1
APPLICATION NO.  : 09/710703
DATED            : November 29, 2005
INVENTOR(S)      : John Josef Hench et al.

It is certified that error appears in the above-identified patent and that said Letters Patent is hereby corrected as shown below:

Column 16, line 67 reads, "...external singular vectors of ● ● or ● ··· ● ● ● Since a ..." and should read -- ...external singular vectors of ● ● or ● ··· ● ● ●. Since a ... --.

Column 18, line 36 reads, "The signal transform block 408 coverts raw, digitized..." and should read -- The signal transform block 408 converts raw, digitized... --.

Column 18, lines 66-67 read, "...be to provide for four 64-bin groupings (quartiles) for non aggregate data. The drift estimates help give more accurate..." and should read -- ...be to provide for four 64-bin groupings (quartiles) for non-aggregate data. The drift estimates help give more accurate... --.

Column 19, line 25 reads, "...or the steady state value of noise before and after and event." and should read -- ...or the steady state value of noise before and after an event. --.

Column 20, line 64 reads, "PSD $_{HDSL\ Disturber}$ = K$_{HDSL}$..." and should read -- PSD $_{HDSL\text{-}Disturber}$ = K$_{HDSL}$... --.

Column 21, line 30 reads, $$\sin^2\left(\frac{\pi f}{f_0}\right) \times \frac{1}{1+\left(\frac{f}{f_{3\ dB-LPF}}\right)^6} \times \frac{f^2}{f^2 + f^2_{3\ dB-HPF}} \times (x_n \times f^{3/2})$$

and should read $$\sin^2\left(\frac{\pi f}{2f_0}\right) \times \frac{1}{1+\left(\frac{f}{f_{3\ dB-LPF}}\right)^6} \times \frac{f^2}{f^2 + f^2_{3\ dB-HPF}} \times (x_n \times f^{3/2})$$

Column 21, line 53 reads, "PSD $_{ADSL\ Disturber}$ = K$_{ADSL}$..." and should read -- PSD $_{ADSL\text{-}Disturber}$ = K$_{ADSL}$... --.

UNITED STATES PATENT AND TRADEMARK OFFICE
CERTIFICATE OF CORRECTION

| | |
|---|---|
| PATENT NO. | : 6,970,560 B1 |
| APPLICATION NO. | : 09/710703 |
| DATED | : November 29, 2005 |
| INVENTOR(S) | : John Josef Hench et al. |

It is certified that error appears in the above-identified patent and that said Letters Patent is hereby corrected as shown below:

Column 22, line 24 reads, "It should also be noted that case certain frequency bins are…" and should read -- It should also be noted that in case certain frequency bins are… --.

Column 22, line 35 reads, "The frequency of zeros just increase the level of confidence…" and should read -- The frequency of zeros just increases the level of confidence… --.

Column 23, line 37 reads, "Furthermore, if the columns of A are suitable normalized,…" and should read -- Furthermore, if the columns of A are suitably normalized,… --.

Column 26, lines 35-37 read, "…identified. This algorithm is appropriate for identifying the sudden changes in SNR that is common when the level of noise from disturbers suddenly change due to an…" and should read -- …identified. This algorithm is appropriate for identifying the sudden changes in SNR that are common when the level noise from disturbers suddenly changes due to an… --.

Column 27, line 10 (Equation 5) reads,
"$p_{ij} \equiv = P\{M(k)=M_j | M(k-1)=M_i\}$" and should read -- $p_{ij} \equiv P\{M(k)=M_j | M(k-1)=M_i\}$ --.

Column 28, lines 11-12 read,
"$P_{01}(k-1)=\mu_{1|1}(P_1(k-1)+(x_1(k-1)-x_{01}(k-1))^{2)+\mu}{}_{2|1}(P_2(k-1)+(x_2(k-1)-x_{01}(k-1))^2)$"
and should read
-- $P_{01}(k-1)=\mu_{1|1}(P_1(k-1)+(x_1(k-1)-x_{01}(k-1))^2)+\mu_{2|1}(P_2(k-1)+(x_2(k-1)-x_{01}(k-1))^2)$ --.

Column 28, lines 13-14 read,
"$P_{02}(k-1)=\mu_{1|2}(P_1(k-1)+(x_1(k-1)-x_{02}(k-1))^{2)+\mu}{}_{2|2}(P_2(k-1)+(x_2(k-1)-x_{02}(k-1))^2)$"
and should read
-- $P_{02}(k-1)=\mu_{1|2}(P_1(k-1)+(x_1(k-1)-x_{02}(k-1))^2)+\mu_{2|2}(P_2(k-1)+(x_2(k-1)-x_{02}(k-1))^2)$ --.

Column 30, lines 24-25 read, "The likelihood functions associated with these moments assuming a Gaussian distribution is…" and should read -- The likelihood functions associated with these moments assuming a Gaussian distribution are… --.

Column 31, line 26 reads, "II. Event Clustering" and should read -- III. Event Clustering --.

UNITED STATES PATENT AND TRADEMARK OFFICE
CERTIFICATE OF CORRECTION

PATENT NO. : 6,970,560 B1
APPLICATION NO. : 09/710703
DATED : November 29, 2005
INVENTOR(S) : John Josef Hench et al.

It is certified that error appears in the above-identified patent and that said Letters Patent is hereby corrected as shown below:

Column 31, line 45 reads, "...collection sample time tk. At this time, a window is either..." and should read -- ... collection sample time $t_k$. At this time, a window is either... --.

Column 32, line 18 reads, "III. Event Analysis" and should read -- IV. Event Analysis --.

Column 33, line 26 reads, "...coefficients and transfer functions. Note that these are the..." and should read -- ...coefficients and transfer functions). Note that these are the... --.

Column 33, line 28 reads, "...defined above in section I. Training, above." and should read -- ...defined above in section I. Training. --.

Column 33, line 35 reads, "...(based upon statistics of observed SNR changes vs. offender..." and should read -- ...based upon statistics of observed SNR changes vs. offender... --.

Column 33, line 40 reads, "...comparison may be be done probabilistically using Bayesian..." and should read -- ...comparison may be done probabilistically using Bayesian... --.

Column 33, line 43 reads, "...connectivity matrix, see section I, Training, above) to some..." and should read -- ...connectivity matrix, see section I. Training) to some... --.

Column 34, line 1 reads, "...$v_{ij}$, i=1, m and j=1, ...,$n_i$,$n_i$ possibly different for each i,..." and should read -- ...$v_{ij}$, i=1, ..., m and j=1, ...,$n_i$,$n_i$ possibly different for each i,... --.

Column 35, lines 1-2 read, "...as "was the victim affected or not?" All objects reporting a chance are included, as are all objects expected to have..." and should read -- ...as "was the victim affected or not?" All object reporting a change are included, as are all objects expected to have... --.

Column 35, lines 8-9 read, "...in the network the events occur and the possible cause depend on which victims are being considered." and should read -- ...in the network the events occur and the possible cause depends on which victims are being considered. --.

UNITED STATES PATENT AND TRADEMARK OFFICE
CERTIFICATE OF CORRECTION

PATENT NO.         : 6,970,560 B1
APPLICATION NO. : 09/710703
DATED                  : November 29, 2005
INVENTOR(S)       : John Josef Hench et al.

It is certified that error appears in the above-identified patent and that said Letters Patent is hereby corrected as shown below:

Column 38, lines 34-35 read, "...lines have become inconclusive. In this case, more than one likely causes may be the conclusion." and should read -- ...lines have become inconclusive. In this case, more than one likely cause may be the conclusion. --.

Column 39, line 40 reads,

"$\Phi_{k+1}^{-1} = \Phi_k^{-1} - \Phi_k^{-1} u_{k+1} (I + u_{k+1}^T \Phi_k^{-1} u_{k+1})^{-1} u_{k+1}^{T\Phi}{}_k^{-1}$" and should read -- $\Phi_{k+1}^{-1} = \Phi_k^{-1} - \Phi_k^{-1} u_{k+1} (I + u_{k+1}^T \Phi_k^{-1} u_{k+1})^{-1} u_{k+1}^T \Phi_k^{-1}$ --.

Column 39, lines 42-43 reads,

"$\Theta_{k+1} = (I - \Phi_k^{-1} u_{k+1} (I + u_{k+1}^T \Phi_k^{-1} u_{k+1})^{-1} u_{k+1}^T) \Theta_k + \Phi_{k-1} y_{k+1} u_{k+1} T)$"

and should read

-- $\Theta_{k+1} = (I - \Phi_k^{-1} u_{k+1} (I + u_{k+1}^T \Phi_k^{-1} u_{k+1})^{-1} u_{k+1}^T)(\Theta_k + \Phi_k^{-1} y_{k+1} u_{k+1}^T)$ --.

Column 40, line 14 reads, "...as four out-of-domain coupling coefficients, $beta_{11}$, $beta/_{12}$,..." and should read -- ...as four out-of-domain coupling coefficients, $beta_{11}$, $beta_{12}$,... --.

Column 40, line 25 reads, "...input spectra of the DSL Services. The inputs $T_1$ and $T_2$, are..." and should read -- ...input spectra of the DSL Services. The inputs $T_1$ and $T_2$ are... --.

Column 40, line 32 reads, "...is assumed to be the identity matrix, i.e., $M_1=1$. Similarly, ..." and should read -- ...is assumed to be the identity matrix, i.e., $M_1=I$. Similarly, ... --.

Column 40, line 67 reads, "...variance to the variance derived from from an ensemble of ..." and should read -- ...variance to the variance derived from an ensemble of... --.

UNITED STATES PATENT AND TRADEMARK OFFICE
CERTIFICATE OF CORRECTION

PATENT NO. : 6,970,560 B1
APPLICATION NO. : 09/710703
DATED : November 29, 2005
INVENTOR(S) : John Josef Hench et al.

It is certified that error appears in the above-identified patent and that said Letters Patent is hereby corrected as shown below:

Column 41, line 48 reads, "… ● ● or ●$^{-1}$ ● ● Since the solution of the identification…" and should read -- … ● ● or ●$^{-1}$ ● ●. Since the solution of the identification… --.

Column 41, line 64 reads, "…of the frequency bins, while the second could be propagate…" and should read -- …of the frequency bins, while the second could be propagating… --.

Column 42, line 65 reads,

"$\hat{v}_{jk}\sigma^2_{jk}|u_j|^2$" and should read -- $\hat{v}_{jk} = \sigma^2_{jk}|u_j|^2$ --.

Column 43, line 40 reads, "Impairment Estimation for Out-of-Domain Offenders" and should read -- 3. Impairment Estimation for Out-of-Domain Offenders --.

Column 43, line 27 reads,

"$\hat{v}_{pq,jk}\Sigma^2_{pq,jk}|u_{pq,j}|^2$" and should read -- $\hat{v}_{pq,jk}\ \sigma^2_{pq,jk}|u_{pq,j}|^2$ --.

Column 45, lines 34-35 read, "…instructions which, when executed in a processing system, causes said system to perform a method, the method com-…" and should read -- …instructions which, when executed in a processing system, cause said system to perform a method, the method com-… --.

Signed and Sealed this

Twenty-sixth Day of February, 2008

JON W. DUDAS
*Director of the United States Patent and Trademark Office*